US012504776B2

(12) United States Patent
Lawson et al.

(10) Patent No.: US 12,504,776 B2
(45) Date of Patent: *Dec. 23, 2025

(54) SAFETY KNOB ASSEMBLY SYSTEMS

(71) Applicant: RangeSafe, LLC, Bracey, VA (US)

(72) Inventors: Trevor Lawson, Bracey, VA (US); James Steven Burt, Lynn, MA (US); Robert William Milotte, Jr., Naples, FL (US)

(73) Assignee: RangeSafe, LLC, Bracey, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/591,433

(22) Filed: Feb. 29, 2024

(65) Prior Publication Data

US 2025/0138568 A1    May 1, 2025

Related U.S. Application Data

(63) Continuation of application No. 18/494,272, filed on Oct. 25, 2023, now Pat. No. 11,960,315.

(51) Int. Cl.
*G05G 1/08* (2006.01)
*F16K 35/00* (2006.01)
(Continued)

(52) U.S. Cl.
CPC .............. *G05G 1/082* (2013.01); *G05G 1/10* (2013.01); *G05G 5/005* (2013.01); *G05G 5/05* (2013.01);
(Continued)

(58) Field of Classification Search
CPC ........... G05G 1/082; G05G 1/10; G05G 1/12; G05G 5/005; G05G 5/05; G05G 5/06;
(Continued)

(56) References Cited

U.S. PATENT DOCUMENTS 2,829,538 A   4/1958  Mueller
2,849,891 A   9/1958  Mills
(Continued)

FOREIGN PATENT DOCUMENTS

EP   2624095 A1   8/2013
FR   2612331 A1   9/1988
(Continued)

OTHER PUBLICATIONS

Range Safe Knobs, first available Sep. 14, 2022, Facebook, [online], [site visited Oct. 19, 2023], Available from internet URL: https://www.facebook.com/photo?fbid=798598351137477&set=pb.100029619591569.-2207520000 ( Year: 2022) , 1 page.
(Continued)

*Primary Examiner* — Adam D Rogers
(74) *Attorney, Agent, or Firm* — Carr & Ferrell LLP

(57) ABSTRACT

The present technology relates to an automatically locking, releasable, safety knob assembly for a stove. The assembly includes a base with a locking notch. An adapter mates with the stove's valve stem and has a head, a tubular middle section, and an adapter base with a central aperture for receiving the valve stem. The knob includes a housing with a housing disk covering the base, an arm movement channel aligned with the locking notch in the locked configuration, and a central aperture for receiving the adapter head. The assembly further includes a sub-assembly with a slidable button allowing free rotation of the knob in the unlocked configuration, an automatic locking arm biased with the slidable button, and engagement with the button causing the arm to disengage from the locking notch and move in the arm movement channel, enabling the knob to freely rotate and rotate the valve stem.

18 Claims, 13 Drawing Sheets

(51) Int. Cl.
 *F24C 3/12* (2006.01)
 *G05G 1/10* (2006.01)
 *G05G 5/00* (2006.01)
 *G05G 5/05* (2006.01)
 *G05G 5/06* (2006.01)
 *G05G 5/28* (2006.01)

(52) U.S. Cl.
 CPC ............... *G05G 5/06* (2013.01); *G05G 5/28* (2013.01); *F16K 35/00* (2013.01); *F24C 3/12* (2013.01); *G05G 2505/00* (2013.01)

(58) Field of Classification Search
 CPC ...... G05G 5/28; G05G 2505/00; F16K 35/00; F16K 35/02; F16K 35/027; F24C 3/12; Y10T 74/2084
 See application file for complete search history.

(56) References Cited

U.S. PATENT DOCUMENTS

| | | | |
|---|---|---|---|
| 3,158,034 | A | 11/1964 | Williamson |
| 3,427,680 | A | 2/1969 | Gilbert |
| 4,253,690 | A | 3/1981 | Hollander |
| 4,300,525 | A | 11/1981 | Delgado et al. |
| 5,363,720 | A | 11/1994 | Sanchez |
| 5,741,003 | A | 4/1998 | Segien, Jr. |
| 5,771,878 | A | 6/1998 | Lewis et al. |
| 5,931,150 | A | 8/1999 | Bowen et al. |
| 6,375,150 | B1 | 4/2002 | Aguirre-Esponda et al. |
| 6,394,081 | B1 | 5/2002 | Aguirre-Esponda et al. |
| D525,518 | S | 7/2006 | Baldwin |
| 7,745,749 | B2 | 6/2010 | Ito |
| 7,922,342 | B2 | 4/2011 | Okada |
| D637,886 | S | 5/2011 | Bengtson |
| 8,434,199 | B1 | 5/2013 | Bowen et al. |
| 8,944,404 | B2 | 2/2015 | Giacomini |
| 8,967,019 | B2 | 3/2015 | O'Keefe et al. |
| 9,182,773 | B2 | 11/2015 | Campean |
| 9,188,408 | B2 | 11/2015 | Huynh |
| 9,268,356 | B2 | 2/2016 | Burleson |
| D762,593 | S | 8/2016 | Oneufer et al. |
| D766,699 | S | 9/2016 | Vergin |
| 9,684,329 | B2 | 6/2017 | Lawson |
| D792,189 | S | 7/2017 | Incukur |
| D806,511 | S | 1/2018 | Yuan |
| D824,236 | S | 7/2018 | Chintis et al. |
| 10,051,996 | B2 | 8/2018 | Starr |
| 10,114,405 | B2 | 10/2018 | Swayne et al. |
| D849,502 | S | 5/2019 | Lucic |
| 10,327,591 | B2 | 6/2019 | Starr |
| 10,452,093 | B2 | 10/2019 | Lawson |
| 10,475,597 | B2 | 11/2019 | Taborsky |
| 10,831,230 | B2 | 11/2020 | Lawson |
| D903,396 | S | 12/2020 | Lucic et al. |
| D903,397 | S | 12/2020 | Lucic |
| D903,465 | S | 12/2020 | Lucic |
| D913,027 | S | 3/2021 | Lucic |
| D918,637 | S | 5/2021 | Yang |
| D924,660 | S | 7/2021 | Blum et al. |
| D925,975 | S | 7/2021 | Ryu et al. |
| 11,126,214 | B1 | 9/2021 | Tu |
| 11,143,411 | B2 * | 10/2021 | Kim ........................ F24C 7/08 |
| 11,608,987 | B1 | 3/2023 | Blum et al. |
| D996,886 | S | 8/2023 | Ryu et al. |
| D996,947 | S | 8/2023 | Zhang et al. |
| D1,024,724 | S | 4/2024 | Blum et al. |
| 11,960,315 | B1 | 4/2024 | Lawson et al. |
| D1,036,930 | S | 7/2024 | Lawson |
| 12,204,359 | B1 | 1/2025 | Lawson et al. |
| 2015/0370283 | A1 | 12/2015 | Lawson |
| 2016/0209863 | A1 | 7/2016 | Stringos |
| 2017/0336824 | A1 | 11/2017 | Lawson |
| 2020/0050233 | A1 | 2/2020 | Lawson |
| 2020/0149745 | A1 | 5/2020 | Kim et al. |

FOREIGN PATENT DOCUMENTS

| | | |
|---|---|---|
| GB | 2253898 A | 9/1992 |
| WO | WO2015180789 A1 | 12/2015 |

OTHER PUBLICATIONS

Stove Knob Covers for Child Safety, Amazon, [online], [site visited Oct. 29, 2023], Available from internet URL: https://www.amazon.com/Covers-Kitchen-Protector-Adhesive-Childproof/dp/B0BXHFFH6T (Year: 2023), 9 pages.

Ultimate Brushed Stainless & Polished Mix, RangeSafe, [online], [site visited Oct. 19, 2023], Available from internet URL: https://www.rangesafe.com/store/p/ultimate-brushed-stainless-polished (Year: 2023), 5 pages.

Viking Professional 5 Series 5.1 Cu. Ft. Freestanding Gas Convection Range, Best Buy, [online], [site visited Oct. 19, 2023], Available from internet URL: hhttps://www.bestbuy.com/site/viking-professional-5-series-5-1-cu-ft-freestanding-gas-convection-range-stainless-steel/6350347.p?skuId=6350347 (Year: 2023), 6 pages.

2-pack Stove Child Safety Knob—PARKB3XHY Style Safety Insert Replacement, listed Jul. 24, 2025, Etsy, [online], [site visited Aug. 12, 2025], Available from internet URL: https://www.etsy.com/listing/1867840416/2-pack-stove-child-safety-knob-parkb3xhy. 3 pages.

* cited by examiner

SAFETY KNOB ASSEMBLY SYSTEMS

CROSS-REFERENCE TO RELATED APPLICATIONS

This Patent Application is a continuation of U.S. patent application Ser. No. 18/494,272, filed Oct. 25, 2023. The aforementioned disclosure is hereby incorporated by reference herein in its entirety for all purposes including all references cited therein.

FIELD OF THE PRESENT TECHNOLOGY

The present technology relates generally to safety knobs and, more particularly, but not by limitation, to automatically locking, releasable, safety knob assembly systems for use on stoves and other appliances.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Previous approaches for safety knob assemblies for stoves have typically involved manual locking mechanisms that require the user to physically engage or disengage the locking mechanism to secure or release the knob. These manual locking mechanisms often rely on additional components such as pins, levers, or buttons that need to be manipulated by the user to lock or unlock the knob. While these manual locking mechanisms provide a certain level of safety, they can be cumbersome and inconvenient for the user, especially in situations where quick and easy access to the stove is required.

Other approaches have attempted to address the limitations of manual locking mechanisms by incorporating automatic locking features. These automatic locking mechanisms typically utilize complex electronic components to automatically lock the knob when not in use. However, these previous approaches have often been overly complicated, expensive to manufacture, and prone to mechanical failures or malfunctions.

Additionally, previous safety knob assemblies have not provided a comprehensive solution that combines the features described in this disclosure. These previous approaches have either relied on manual locking mechanisms or complex automatic electronic locking mechanisms, but none have successfully integrated an automatically locking, releasable sub-assembly that allows for free rotation of the knob when in an unlocked configuration. Furthermore, none of these previous approaches have incorporated a housing disk with an arm movement channel aligned with a locking notch, which enables the automatic locking arm to disengage from the locking notch and move freely, resulting in the unlocked configuration of the safety knob assembly.

Therefore, there is a need in the art for an improved automatically locking, releasable safety knob assembly that overcomes the limitations of previous approaches and provides a more convenient and reliable solution for stove safety.

SUMMARY

In some aspects, the techniques described herein relate to an automatically locking, releasable, safety knob assembly, including: a base configured to mount to a stove surface of a stove, the base including: a disk portion; and an outer peripheral sidewall; and an inner peripheral sidewall, the inner peripheral sidewall including a locking notch; an adapter configured to mate with a valve stem of the stove extending through the base, the adapter including: a head; a tubular middle section; an adapter base; and an adapter central aperture extending through the adapter base, the tubular middle section, and the head, the adapter central aperture configured to receive the valve stem of the stove; and a knob including: a knob housing; a housing disk covering the base, the housing disk including: an arm movement channel aligned with the locking notch when the safety knob assembly is in a locked configuration; and a housing disk central aperture, the housing disk central aperture configured for receiving the head of the adapter; and an automatically locking, releasable, sub-assembly, including: a slidable button configured to allow free rotation of the knob when the safety knob assembly is in an unlocked configuration; and an automatic locking arm resiliently biased with the slidable button; wherein engagement of the slidable button causes the automatic locking arm to disengage from the locking notch and further causes the automatic locking arm to move in the arm movement channel causing the safety knob assembly to be in the unlocked configuration and allowing the knob to freely rotate resulting in rotating of the valve stem.

In some aspects, the techniques described herein relate to an automatically locking, releasable, safety knob assembly, wherein when the safety knob assembly is in the locked configuration the knob is in a locked position and the valve stem is in an off position preventing rotation of the valve stem.

In some aspects, the techniques described herein relate to an automatically locking, releasable, safety knob assembly, wherein when the safety knob assembly is in the unlocked configuration the knob is in an unlocked position and the valve stem is in an on position allowing rotation of the valve stem.

In some aspects, the techniques described herein relate to an automatically locking, releasable, safety knob assembly, wherein the knob housing further includes: a contact portion configured to allow contact from fingers of a user for rotating the knob when the safety knob assembly is in the unlocked configuration, the contact portion including: a left side opposing contact portion; and a right side opposing contact portion, the right side opposing contact portion being opposed to the left side opposing contact portion.

In some aspects, the techniques described herein relate to an automatically locking, releasable, safety knob assembly, wherein the automatic locking arm is resiliently biased with the slidable button using a spring.

In some aspects, the techniques described herein relate to an automatically locking, releasable, safety knob assembly, wherein the automatically locking, releasable, sub-assembly, further includes a spring positioning peg, the spring positioning peg configured to position the spring for the automatic locking arm to be resiliently biased with the slidable button.

In some aspects, the techniques described herein relate to an automatically locking, releasable, safety knob assembly, wherein when the safety knob assembly is in the locked configuration the knob is in a locked position and the valve stem is in an off position preventing rotation of the valve stem and the spring causes the automatic locking arm to be resiliently biased with the slidable button and causing the automatic locking arm to automatically remain engaged with the locking notch.

In some aspects, the techniques described herein relate to an automatically locking, releasable, safety knob assembly, wherein when the safety knob assembly is in the unlocked configuration the knob is in an unlocked position and the valve stem is in an on position allowing rotation of the valve stem and the spring causing the automatic locking arm to be resiliently biased with the slidable button and causing the automatic locking arm to automatically engage with the locking notch when the automatic locking arm is aligned with the locking notch.

In some aspects, the techniques described herein relate to an automatically locking, releasable, safety knob assembly, wherein the automatic locking arm further includes a central arm movement aperture.

In some aspects, the techniques described herein relate to an automatically locking, releasable, safety knob assembly, wherein the central arm movement aperture is angled in a direction opposite of the slidable button.

In some aspects, the techniques described herein relate to an automatically locking, releasable, safety knob assembly, wherein the automatically locking, releasable, sub-assembly, further includes a sliding attachment dowel, the sliding attachment dowel configured to mate with the central arm movement aperture.

In some aspects, the techniques described herein relate to an automatically locking, releasable, safety knob assembly, wherein when the safety knob assembly is in the locked configuration the sliding attachment dowel is in a lower portion of the central arm movement aperture causing the automatic locking arm to engage with the locking notch and further causing the knob to be in the locked configuration and the valve stem to be in an off position preventing rotation of the valve stem.

In some aspects, the techniques described herein relate to an automatically locking, releasable, safety knob assembly, wherein when the safety knob assembly is in the unlocked configuration the sliding attachment dowel is in an upper portion of the central arm movement aperture causing the automatic locking arm to disengage with the locking notch further causing the knob to be in the unlocked configuration and the valve stem to be in an on position allowing rotation of the valve stem.

In some aspects, the techniques described herein relate to an automatically locking, releasable, safety knob assembly, wherein the housing disk covering the base further includes at least one positioning aperture, the at least one positioning aperture used to attach the housing disk to the knob housing.

In some aspects, the techniques described herein relate to an automatically locking, releasable, safety knob assembly, wherein the adapter base further includes: an adapter base outer peripheral sidewall; and an adapter base inner peripheral sidewall, the adapter base inner peripheral sidewall including: valve stem compatibility notches, the valve stem compatibility notches allowing the adapter base to mate with the valve stem.

In some aspects, the techniques described herein relate to an automatically locking, releasable, safety knob assembly, wherein the knob housing further includes: a central shaft portion, the central shaft portion configured to mate with the head of the adapter; and a central shaft aperture, the central shaft aperture configured to receive the valve stem.

In some aspects, the techniques described herein relate to an automatically locking, releasable, safety knob assembly, wherein when the safety knob assembly is in the locked configuration the central shaft aperture is receiving the valve stem and the valve stem is in an off position preventing rotation of the valve stem.

In some aspects, the techniques described herein relate to an automatically locking, releasable, safety knob assembly, wherein when the safety knob assembly is in the unlocked configuration the central shaft aperture is receiving the valve stem and the valve stem is in an on position allowing rotation of the valve stem.

In some aspects, the techniques described herein relate to an automatically locking, releasable, safety knob assembly, including: a base configured to mount to a stove surface of a stove, the base including: a disk portion; and an outer peripheral sidewall; and an inner peripheral sidewall, the inner peripheral sidewall including a locking notch; an adapter configured to mate with a valve stem of the stove extending through the base, the adapter including: a head; a tubular middle section; an adapter base; and an adapter central aperture extending through the adapter base, the tubular middle section, and the head, the adapter central aperture configured to receive the valve stem of the stove; and a knob including: a knob housing; and a housing disk covering the base, the housing disk including: an arm movement channel aligned with the locking notch when the safety knob assembly is in a locked configuration; and a housing disk central aperture, the housing disk central aperture configured for receiving the head of the adapter; and an automatically locking, releasable, sub-assembly, including: a slidable button configured to allow free rotation of the knob when the safety knob assembly is in an unlocked configuration; and an automatic locking arm resiliently biased with the slidable button; wherein the slidable button is not engaged and the automatic locking arm is engaged with the locking notch preventing the automatic locking arm from moving in the arm movement channel causing the safety knob assembly to be in the locked configuration and preventing the knob from freely rotating preventing rotating of the valve stem.

In some aspects, the techniques described herein relate to an automatically locking, releasable, safety knob assembly, including: a base configured to mount to a stove surface of a stove, the base including: a disk portion; and an outer peripheral sidewall; and an inner peripheral sidewall, the inner peripheral sidewall including a locking notch; an adapter configured to mate with a valve stem of the stove extending through the base, the adapter including: a head; a tubular middle section; an adapter base; and an adapter central aperture extending through the adapter base, the tubular middle section, and the head, the adapter central aperture configured to receive the valve stem of the stove; a knob including: a knob housing; and a housing disk covering the base, the housing disk including: an arm movement channel aligned with the locking notch when the safety knob assembly is in a locked configuration; a housing disk central aperture, the housing disk central aperture configured for receiving the head of the adapter; and a sliding attachment dowel, the sliding attachment dowel configured to mate with a central arm movement aperture; and an automatically locking, releasable, sub-assembly, including: a slidable button configured to allow free rotation of the knob when the safety knob assembly is in an unlocked configuration; and an automatic locking arm resiliently biased with the slidable button, the automatic locking arm including the central arm movement aperture, the central arm movement aperture being angled in a direction opposite of the slidable button; wherein the safety knob assembly is in the locked configuration and the sliding attachment dowel is in a lower portion of the central arm movement aperture causing the automatic locking arm to engage with the locking notch and further causing the knob to be in the locked configuration and the valve stem to be in an off position preventing rotation of the valve stem; wherein the slidable button is not engaged and the automatic locking arm is engaged with the locking notch preventing the automatic locking arm from moving in the arm movement channel causing the safety knob assembly to be in the locked configuration and preventing the knob from freely rotating preventing rotating of the valve stem.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

DETAILED DESCRIPTION

In the following description, for purposes of explanation, numerous specific details are set forth in order to provide a thorough understanding of the disclosure. It will be apparent, however, to one skilled in the art, that the disclosure may be practiced without these specific details. In other instances, structures and devices may be shown in block diagram form only in order to avoid obscuring the disclosure. It should be understood that the disclosed embodiments are merely exemplary of the invention, which may be embodied in multiple forms. Those details disclosed herein are not to be interpreted in any form as limiting, but as the basis for the claims.

A problem exists that stoves can be turned-on accidentally by bumping into or brushing against the stove knobs. For example, leaning against the stove front or reaching for the microwave are common causes for accidentally turning on stoves. Also, pets reaching for food on the stovetop can result in accidental turning-on of the stove knobs. Additionally, young children or older adults with cognitive issues my turn on an unattended stove.

The present technology makes it more difficult for a burner on a stove or range to be turned on accidentally or by a small child or by a household pet. In other words, the present technology reduces the potential for a stove or range to be turned on by mistake or by someone who is not competent to use the stove. Accordingly, the present technology provides systems that reduce the risk of unintentional activation of gas stoves and electric stoves that could result in fires and gas leaks.

In general, the present technology is directed to an automatically locking, releasable, safety knob assembly including safety knobs that automatically lock when in the "off" position. To be clear, an "off" position as referred to herein should be understood to include a state of position of a power or fuel source for a stove. For example, a valve stem that controls emission of gas in a gas stovetop would be "off" when no gas is flowing through the gas burner on the stove. This is typically accomplished by placing a temperature knob in an "off" position. The "off" position of the temperature knob is aligned with the "off" position of the valve stem of the gas burner. A similar configuration exists for an electric burner with the exception that the temperature knob is not coupled to a valve stem but a potentiometer or thermostat. An "off" position of the temperature knob corresponds to an "off" position for the electric burner, meaning that no electricity is flowing to the electric burner.

The present technology advantageously provides a releasable, locking, safety knob including an automatic locking feature for the knob that prevents unintentional movement of the knob away from an "off" position. These and other advantages of the present technology will be described in greater detail below.

Figure 1A:
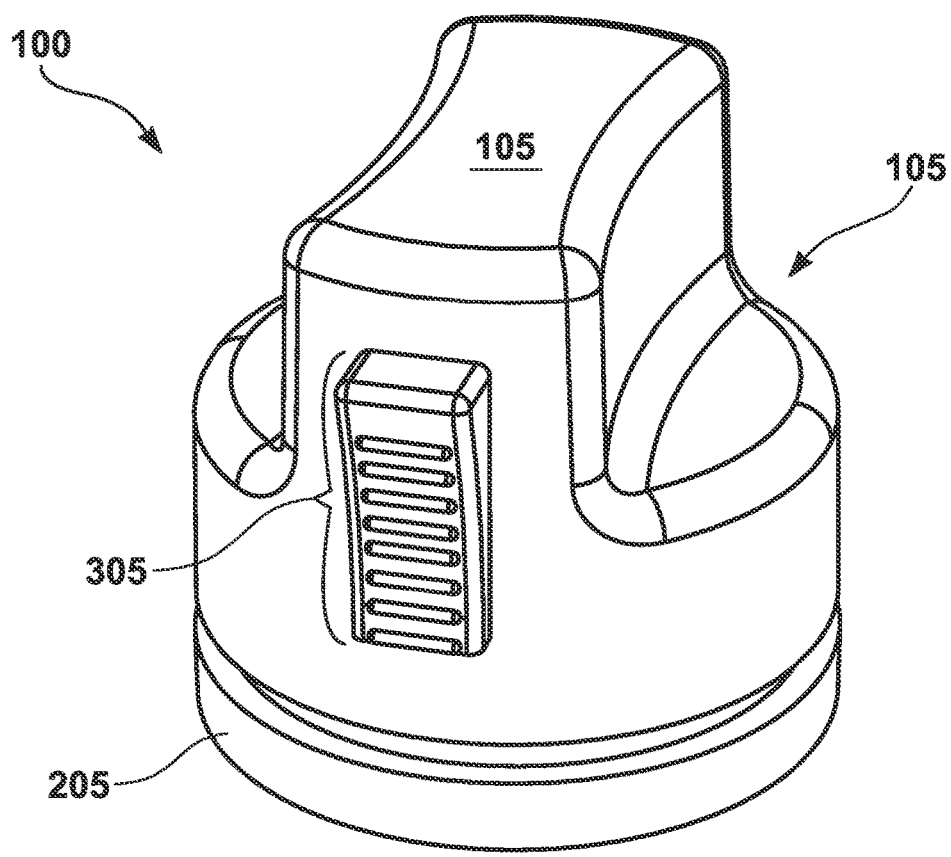
FIG. 1A is a front upper perspective view of an automatically locking, releasable, safety knob assembly according to various embodiments of the present technology.
Figure 1B:
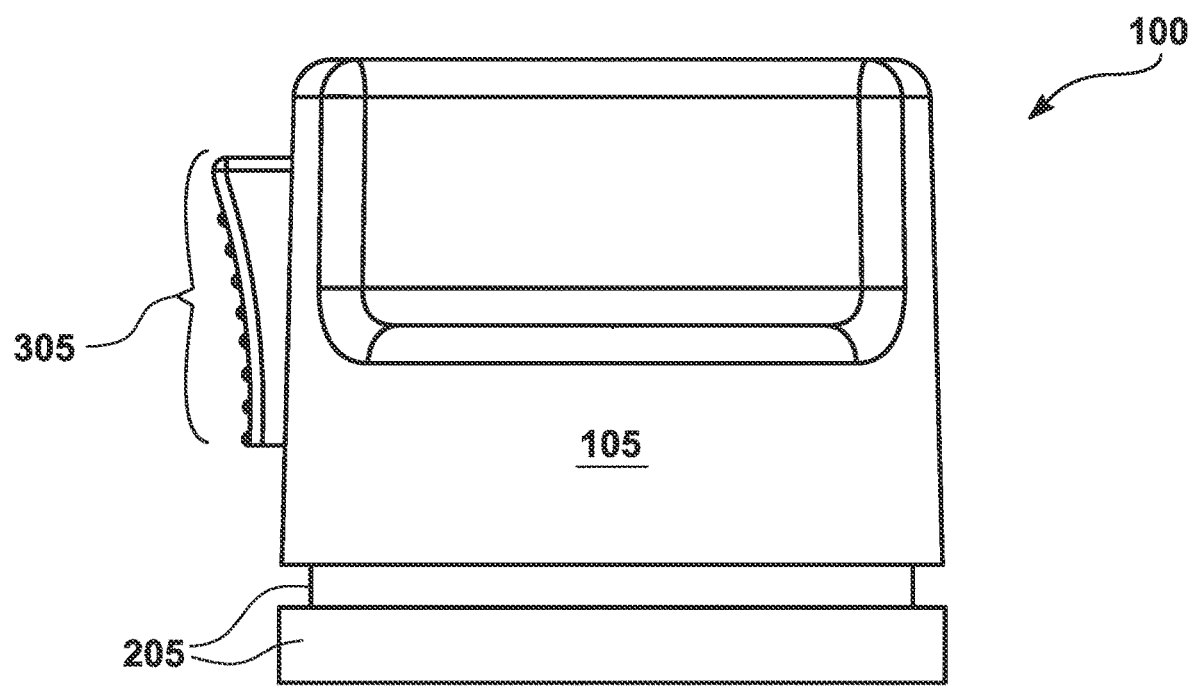
FIG. 1B is a side view of an automatically locking, releasable, safety knob assembly according to various embodiments of the present technology.

According to various embodiments of the present technology, FIG. 1A and FIG. 1B collectively show an automatically locking, releasable, safety knob assembly 100 (also referenced as "the safety knob assembly 100"), in a locked configuration the knob 105 is in a locked position and the valve stem is in an off position preventing rotation of the valve stem. FIG. 1A is a front upper perspective view of an automatically locking, releasable, safety knob assembly 100. FIG. 1A shows the safety knob assembly 100 including the knob 105, the base 205, and a slidable button 305. Furthermore, FIG. 1B is a side view of an automatically locking, releasable, safety knob assembly 100 according to various embodiments of the present technology and FIG. 1B shows a side view of the knob 105, the base 205, and the slidable button 305.

Figure 2A:
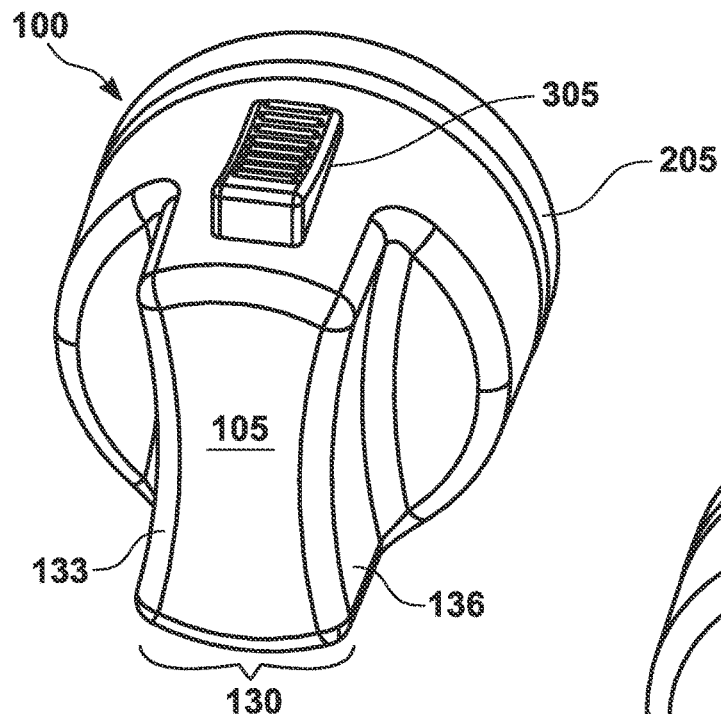
FIG. 2A is a top perspective view of an automatically locking, releasable, safety knob assembly in a locked configuration according to various embodiments of the present technology.
Figure 2B:
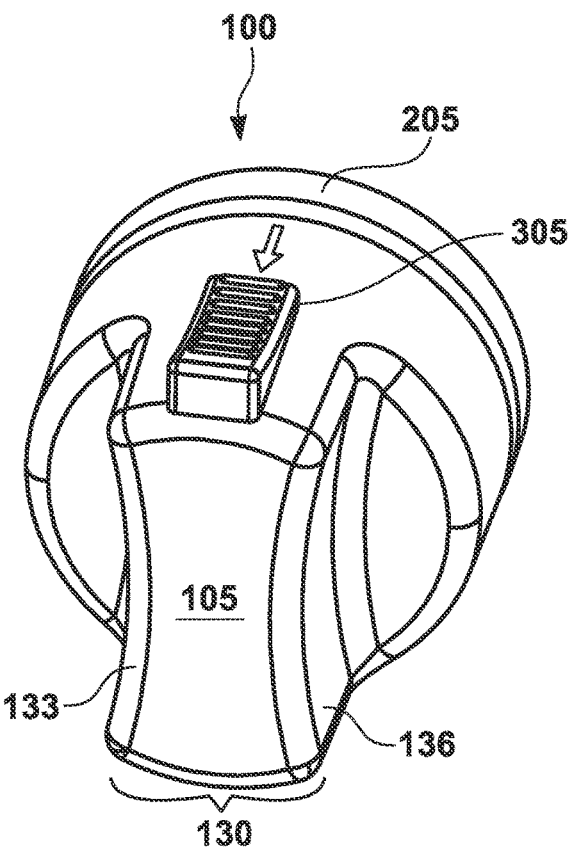
FIG. 2B is a top perspective view of an automatically locking, releasable, safety knob assembly with a slidable button engaged in slidable movement for unlocking to an unlocked configuration according to various embodiments of the present technology.
Figure 2C:
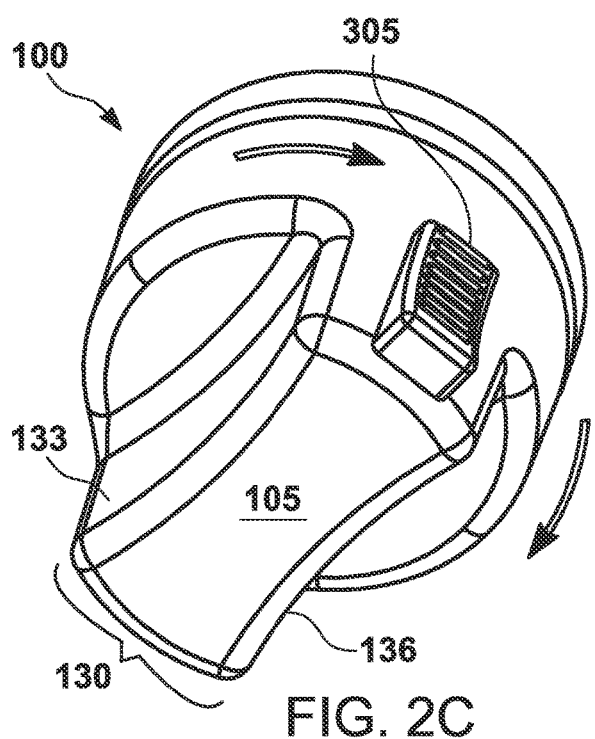
FIG. 2C is a top perspective view of an automatically locking, releasable, safety knob assembly in an unlocked configuration allowing the knob to freely rotate according to various embodiments of the present technology.

According to various embodiments of the present technology, FIG. 2A, FIG. 2B, and FIG. 2C collectively show the safety knob assembly 100 moving from the locked configuration (FIG. 2A) to an unlocked configuration (FIG. 2C) allowing the knob to freely rotating in a clockwise direction resulting in rotating of the valve stem. FIG. 2A, FIG. 2B, and FIG. 2C collectively show a base 205 configured to mount to a stove surface of a stove, the base 205 comprising: a disk portion 210; an outer peripheral sidewall 215; and an inner peripheral sidewall 220. FIG. 2A includes the automatically locking, releasable, safety knob assembly 100, wherein when the safety knob assembly 100 is in the locked configuration the knob 105 is in a locked position and the valve stem is in an off position preventing rotation of the valve stem. FIG. 2C includes the automatically locking, releasable, safety knob assembly 100, wherein when the safety knob assembly 100 is in the unlocked configuration the knob 105 is in an unlocked position and the valve stem is in an on position allowing rotation of the valve stem. For example, FIG. 2A is a top perspective view of an automatically locking, releasable, safety knob assembly 100 in a locked configuration according to various embodiments of the present technology. FIG. 2B is a top perspective view of an automatically locking, releasable, safety knob assembly 100 with the slidable button 305 engaged in a slidable movement for unlocking to an unlocked configuration according to various embodiments of the present technology. For example, the slidable movement may be un upwards movement, the upwards movement being in a perpendicular direction to the stove surface. The slidable movement may also be a downward movement, the downwards movement being in a perpendicular direction to the stove surface. The slidable movement may be any movement that causes the safety knob assembly 100 to be in the unlocked configuration and allows the knob 105 to freely rotate resulting in rotating of the valve stem. Advantageously, slidable button 305 engaged in the slidable movement may be done with by one hand of a user to allow the knob 105 to freely rotate, in contrast with buttons that are pressed or pushed. FIG. 2C is a top perspective view of an automatically locking, releasable, safety knob assembly 100 in an unlocked configuration allowing the knob 105 to freely rotate according to various embodiments of the present technology. For instance, a user may manipulate the knob 105 and operate the stove with the safety knob assembly 100 in the unlocked configuration. The knob may be freely rotating in a clockwise direction as is typical for operating a stove but may also be counterclockwise or in any direction that allows the knob 105 to freely rotate to operate the stove.

In some embodiments a user may manipulate the automatically locking, releasable, safety knob assembly 100, using the knob housing 110 with the fingers of a user from a single hand of the user. For example, the knob housing 110 further comprises: a contact portion 130 configured to allow contact from fingers of a user for rotating the knob 105 when the safety knob assembly 100 is in the unlocked configuration, the contact portion 130 comprising: a left side opposing contact portion 133; and a right side opposing contact portion 136, the right side opposing contact portion 136 being opposed to the left side opposing contact portion 133.

Figure 3A:
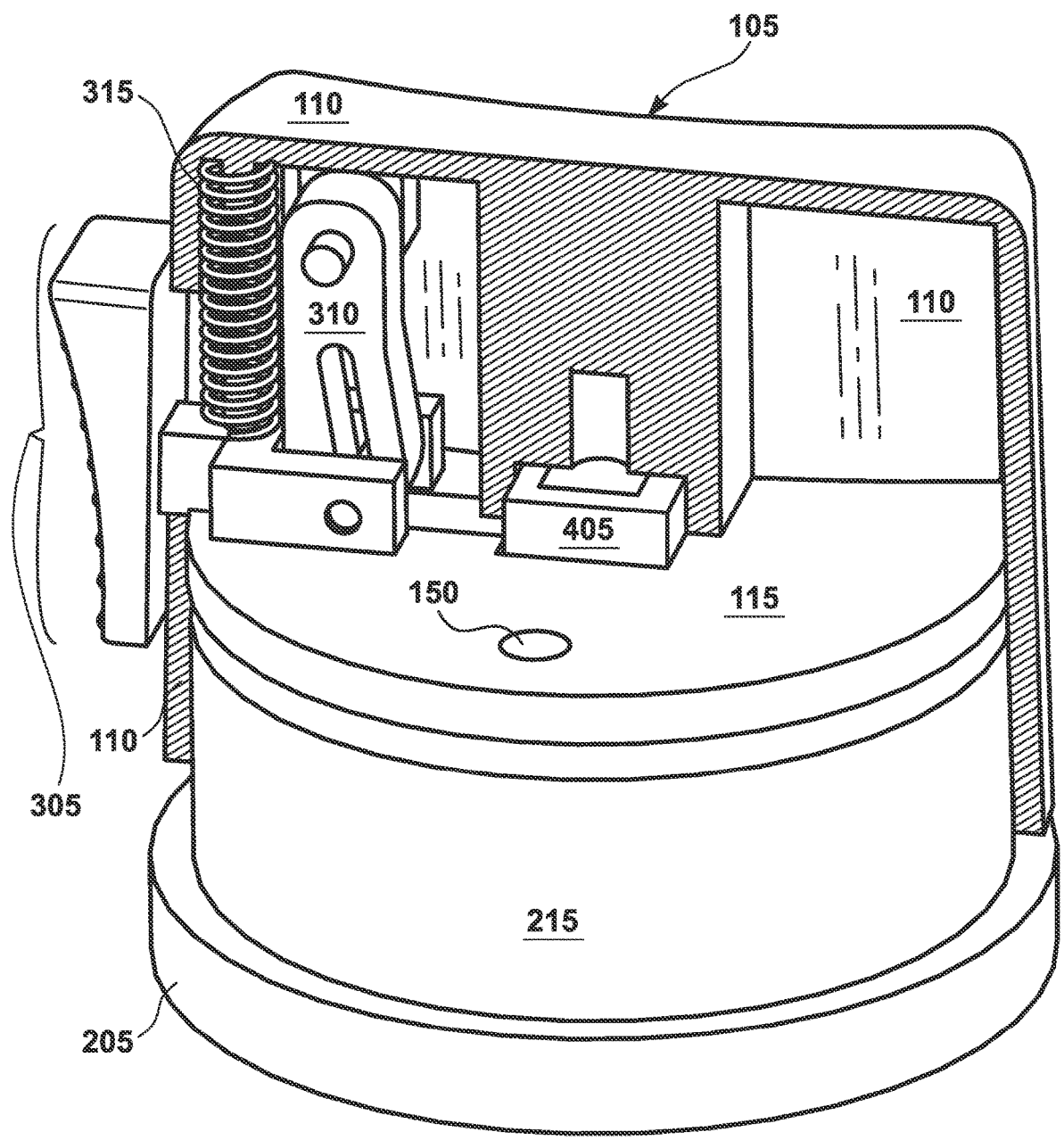
FIG. 3A is a side perspective cross sectional view of an automatically locking, releasable, safety knob assembly in a locked configuration according to various embodiments of the present technology.
Figure 3B:
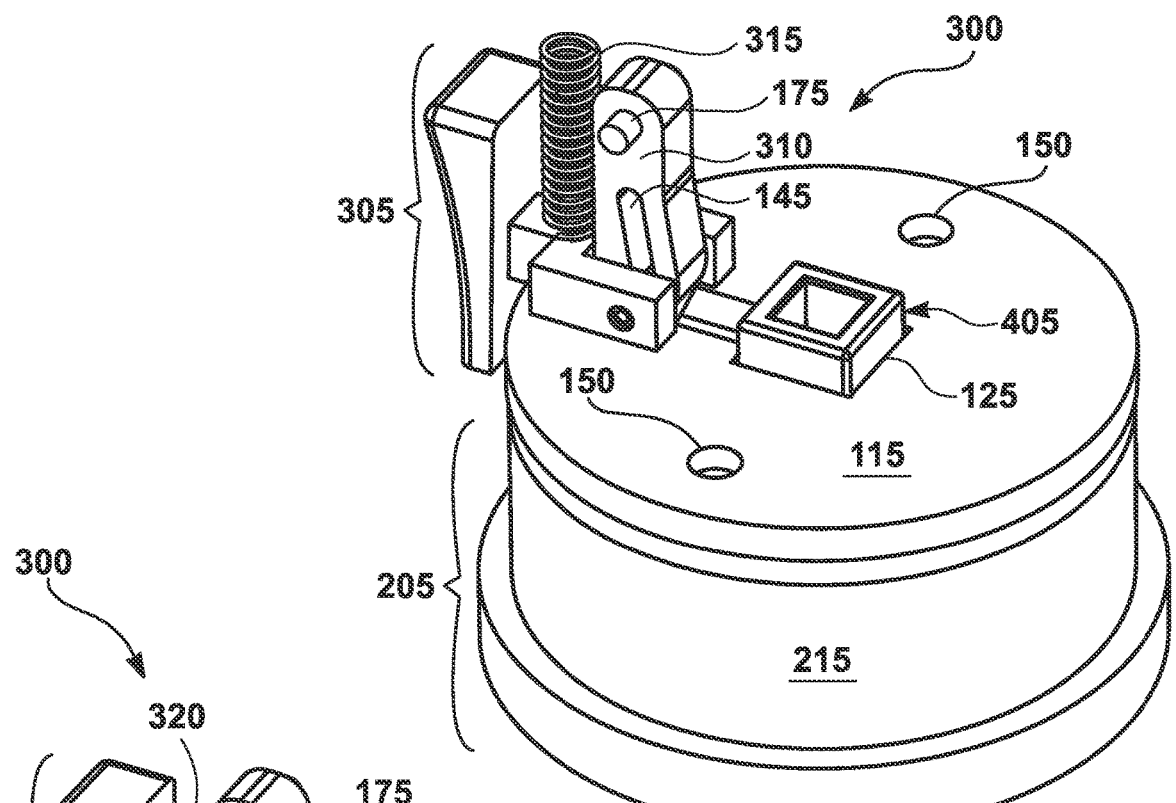
FIG. 3B is a top perspective view of an automatically locking, releasable, safety knob assembly in a locked configuration with a knob housing removed to show an automatically locking, releasable, sub-assembly according to various embodiments of the present technology.
Figure 3C:
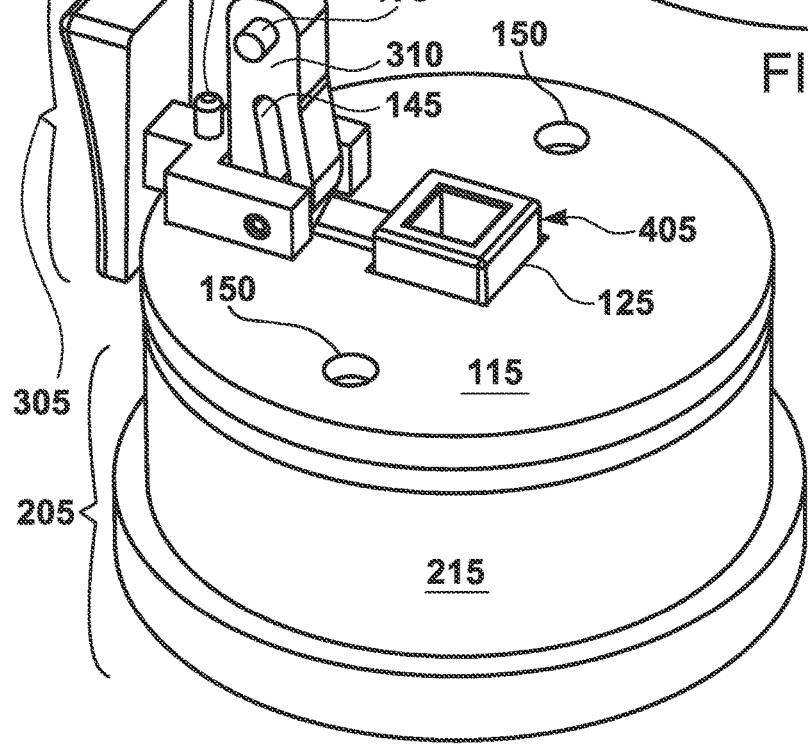
FIG. 3C is a top perspective view of an automatically locking, releasable, safety knob assembly in a locked configuration with a knob housing removed to show an automatically locking, releasable, sub-assembly and with a spring removed according to various embodiments of the present technology.
Figure 3D:
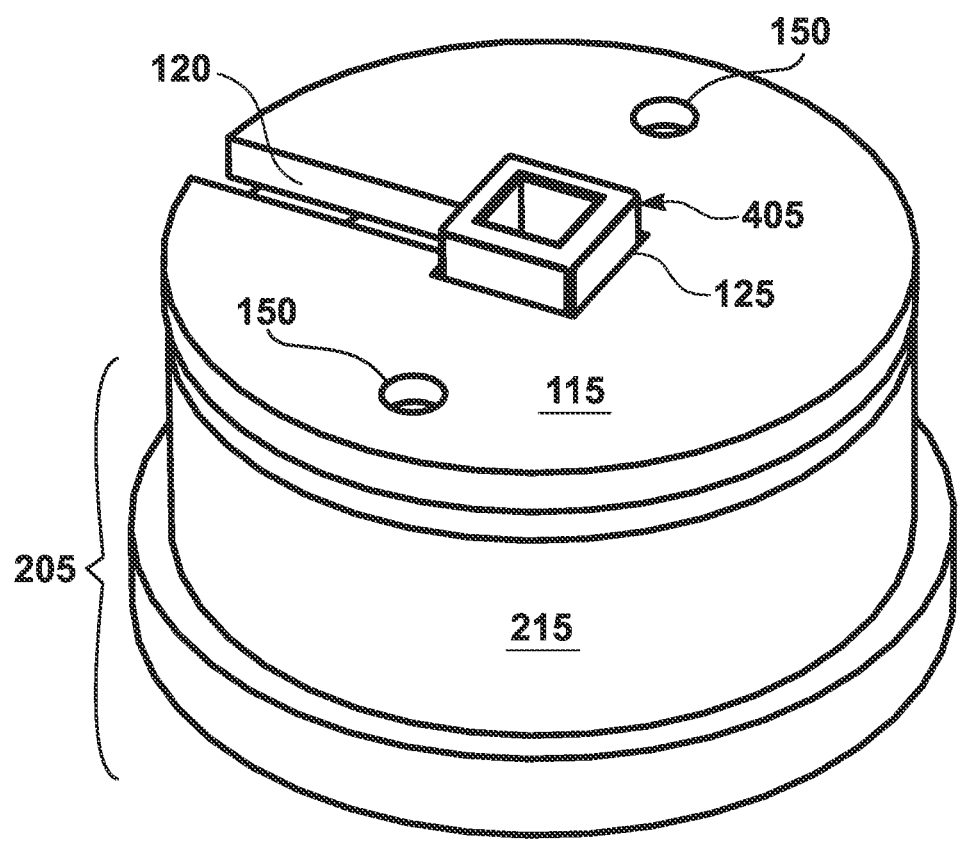
FIG. 3D is a top perspective view of an automatically locking, releasable, safety knob assembly with a knob housing removed to show a housing disk portion, an adapter, and a base according to various embodiments of the present technology.
Figure 3E:
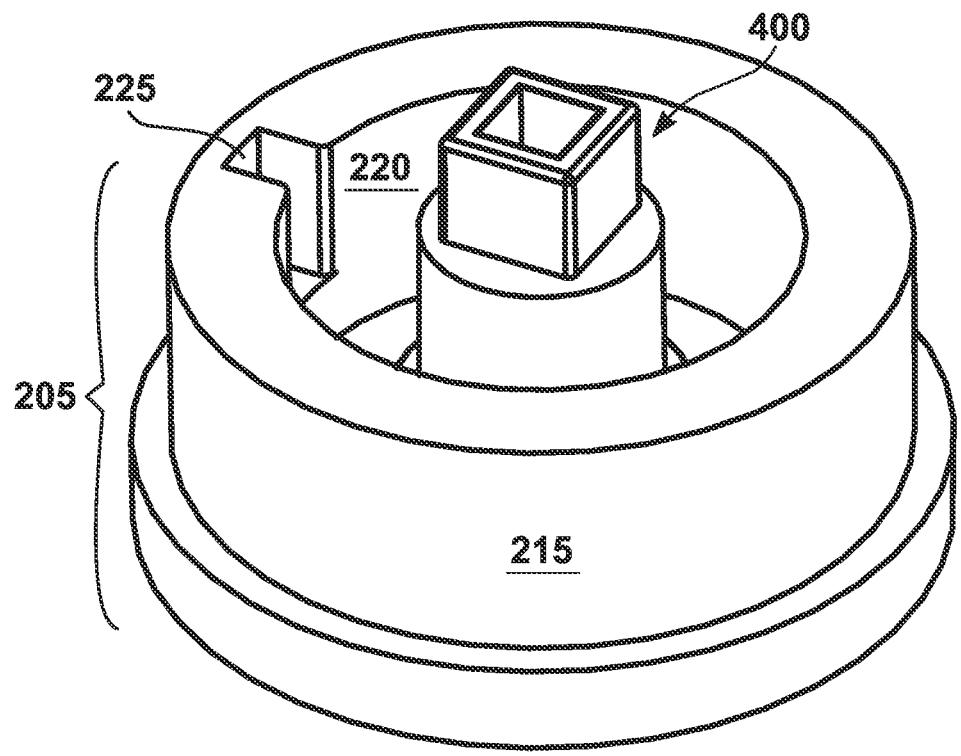
FIG. 3E is a top perspective view of an automatically locking, releasable, safety knob assembly with a knob housing removed and a housing disk removed to show a tubular portion of an adapter, and a base according to various embodiments of the present technology.

FIG. 3A, FIG. 3B, FIG. 3C, FIG. 3D, and FIG. 3E illustrate components of the automatically locking, releasable, safety knob assembly 100 according to various embodiments of the present technology. FIG. 3A is a side perspective cross sectional view of an automatically locking, releasable, safety knob assembly 100 in the locked configuration according to various embodiments of the present technology. FIG. 3B is a top perspective view of an automatically locking, releasable, safety knob assembly 100 in a locked configuration with a knob housing 110 removed to show an automatically locking, releasable, sub-assembly 300 according to various embodiments of the present technology. FIG. 3C is a top perspective view of an automatically locking, releasable, safety knob assembly 100 in a locked configuration with a knob housing 110 removed to show an automatically locking, releasable, sub-assembly 300 and with a spring 315 removed according to various embodiments of the present technology. FIG. 3D is a top perspective view of an automatically locking, releasable, safety knob assembly 100 with a knob housing 110 removed to show a housing disk 115, an adapter, and a base according to various embodiments of the present technology. FIG. 3E is a top perspective view of an automatically locking, releasable, safety knob assembly 100 with a knob housing 110 removed and a housing disk 115 removed to show a tubular middle section 410 according to various embodiments of the present technology.

FIG. 3A, FIG. 3B, FIG. 3C, FIG. 3D, and FIG. 3E illustrate the safety knob assembly 100"), comprising: a base 205 configured to mount to a stove surface of a stove, the base 205 comprising: a disk portion 210; an outer peripheral sidewall 215; and an inner peripheral sidewall 220, the inner peripheral sidewall comprising a locking notch 225; an adapter 400 configured to mate with a valve stem of the stove extending through the base 205, the adapter 400 comprising: a head 405; a tubular middle section 410; an adapter base 415; and an adapter central aperture 420 extending through the adapter base 415, the tubular middle section 410, and the head 405, the adapter central aperture 420 configured to receive the valve stem of the stove; and a knob 105 comprising: a knob housing 110; and a housing disk 115 covering the base 205, the housing disk 115 comprising: an arm movement channel 120 aligned with the locking notch 225 when the safety knob assembly 100 in a locked configuration; and a housing disk central aperture, the housing disk central aperture 125 configured for receiving the head 405 of the adapter; and an automatically locking, releasable, sub-assembly 300, comprising: a slidable button 305 configured to allow free rotation of the knob 105 when the safety knob assembly 100 in an unlocked configuration; an automatic locking arm 310 resiliently biased with the slidable button 305; and wherein engagement of the slidable button 305 causes the automatic locking arm 310 to disengage from the locking notch 225 and further causes the automatic locking arm 310 to move in the arm movement channel 120 causing the safety knob assembly 100 to be in the unlocked and allowing the knob 105 to freely rotate resulting in rotating of the valve stem.

According to some embodiments FIG. 3A, FIG. 3B, FIG. 3C, FIG. 3D, and FIG. 3E illustrate the automatically locking, releasable, safety knob assembly 100, wherein the housing disk covering the base 205 further comprises at least one positioning aperture 150, the at least one positioning aperture 150 used to attach the housing disk to the knob housing 110.

Figure 3F:
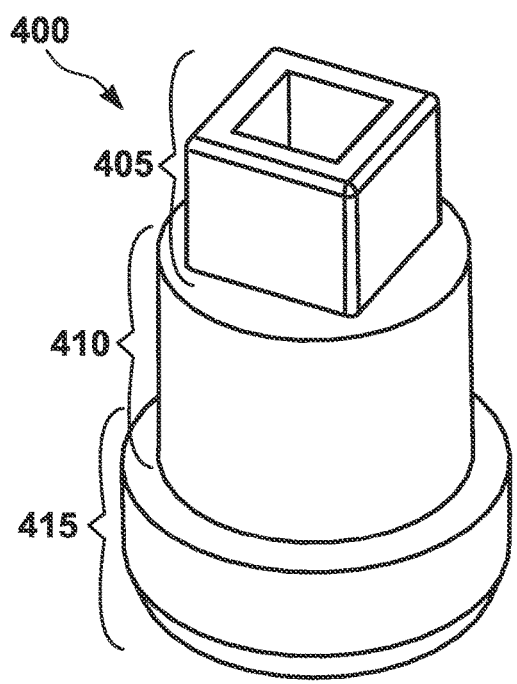
FIG. 3F is a top perspective view of an adapter according to various embodiments of the present technology.
Figure 3G:
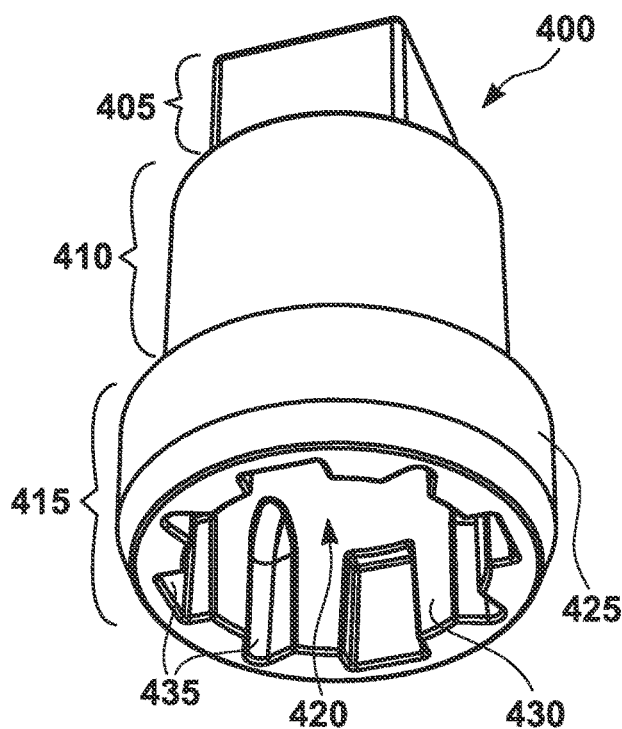
FIG. 3G is a bottom perspective view of an adapter according to various embodiments of the present technology.
Figure 3H:
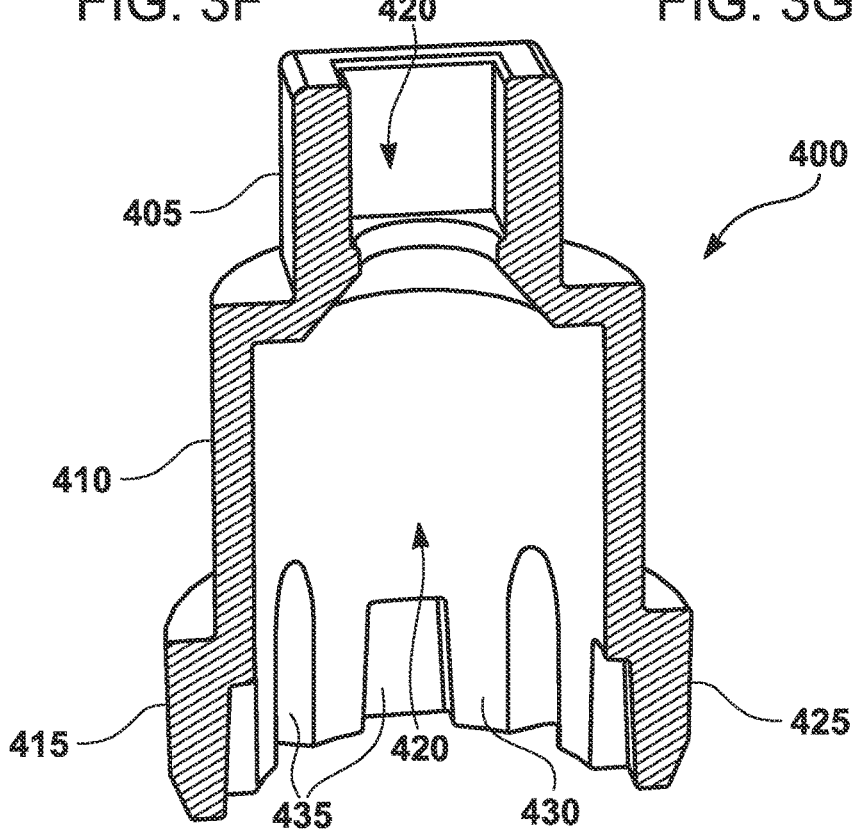
FIG. 3H is a side cross sectional view of an adapter according to various embodiments of the present technology.

FIG. 3F, FIG. 3G, and FIG. 3H collectively show the adapter 400 according to various embodiments of the present technology. FIG. 3F is a top perspective view of an adapter 400 according to various embodiments of the present technology. FIG. 3G is a bottom perspective view of an adapter 400 according to various embodiments of the present technology. FIG. 3H is a side cross sectional view of an adapter 400 according to various embodiments of the present technology. According to various embodiments FIG. 3F, FIG. 3G, and FIG. 3H collectively include the automatically locking, releasable, safety knob assembly 100, wherein the adapter base 415 further comprises: an adapter base outer peripheral sidewall 425; and an adapter base inner peripheral sidewall 430, the adapter base inner peripheral sidewall 430 comprising: valve stem compatibility notches 435, the valve stem compatibility notches 435 allowing the adapter base 415 to mate with the valve stem.

Figure 4A:
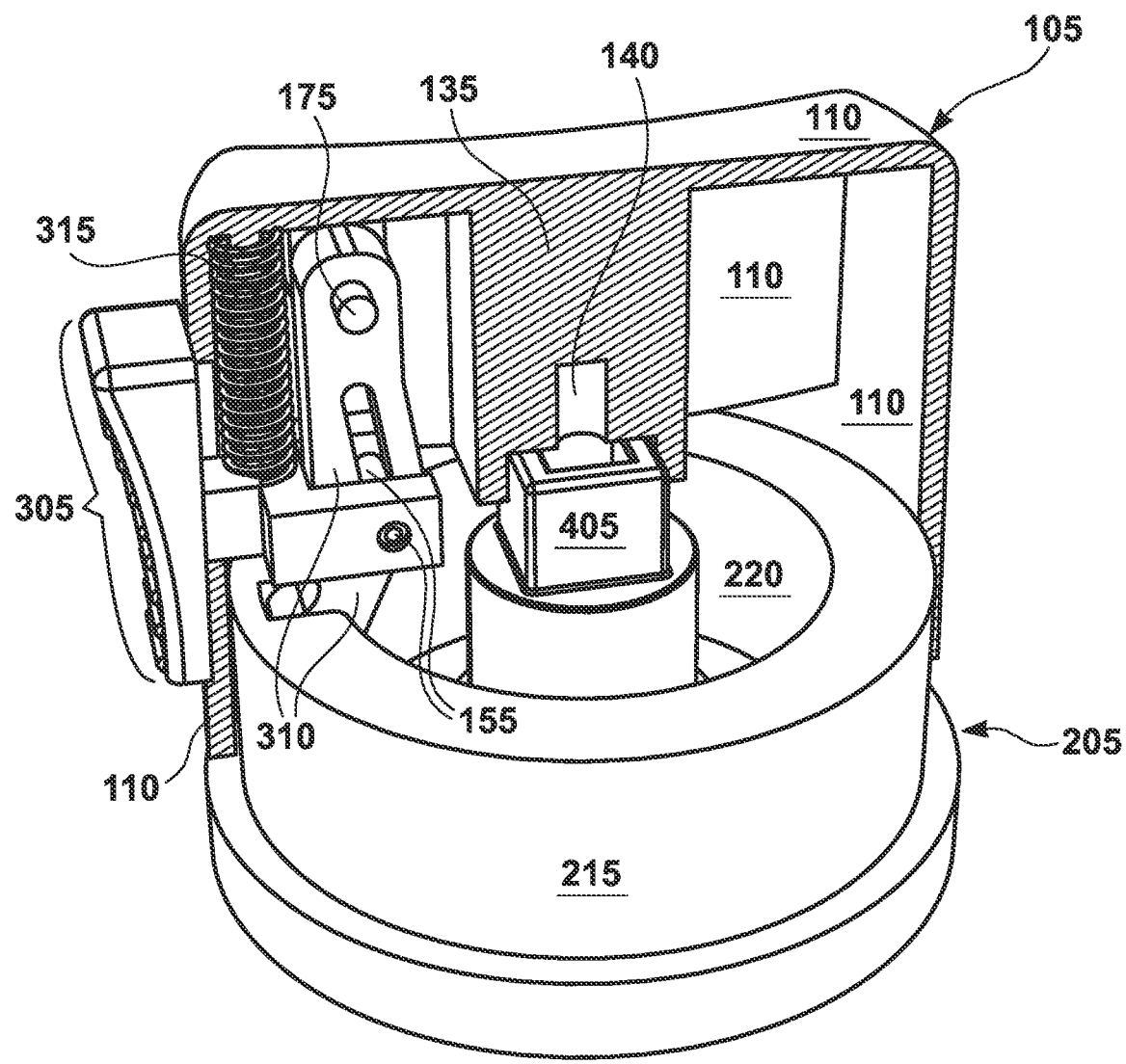
FIG. 4A is a side cross sectional view of the automatically locking, releasable, safety knob assembly including a knob cover, an automatically locking, releasable sub-assembly, and a base according to various embodiments of the present technology.

FIG. 4A is a side cross sectional view of the automatically locking, releasable, safety knob assembly 100 including a knob cover, an automatically locking, releasable sub-assembly 300, and a base according to various embodiments of the present technology. Accordingly to various embodiments FIG. 4A shows the automatically locking, releasable, safety knob assembly 100, wherein the knob housing 110 further comprises: a central shaft portion 135, the central shaft portion 135 configured to mate with the head 405 of the adapter 400; and a central shaft aperture 140, the central shaft aperture 140 configured to receive the valve stem. Furthermore, accordingly to various embodiments FIG. 4A shows the automatically locking, releasable, safety knob assembly 100, wherein when the safety knob assembly 100 is in the locked configuration the central shaft aperture 140 is receiving the valve stem and the valve stem is in an off position preventing rotation of the valve stem.

Figure 4B:
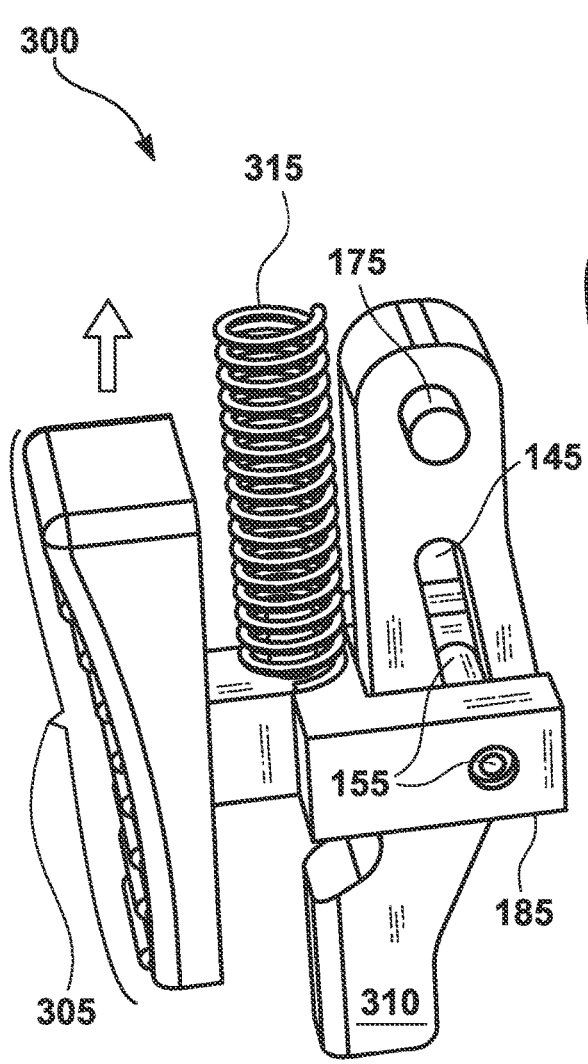
FIG. 4B is a side view of the automatically locking, releasable, sub-assembly in a locked configuration according to various embodiments of the present technology.
Figure 4C:
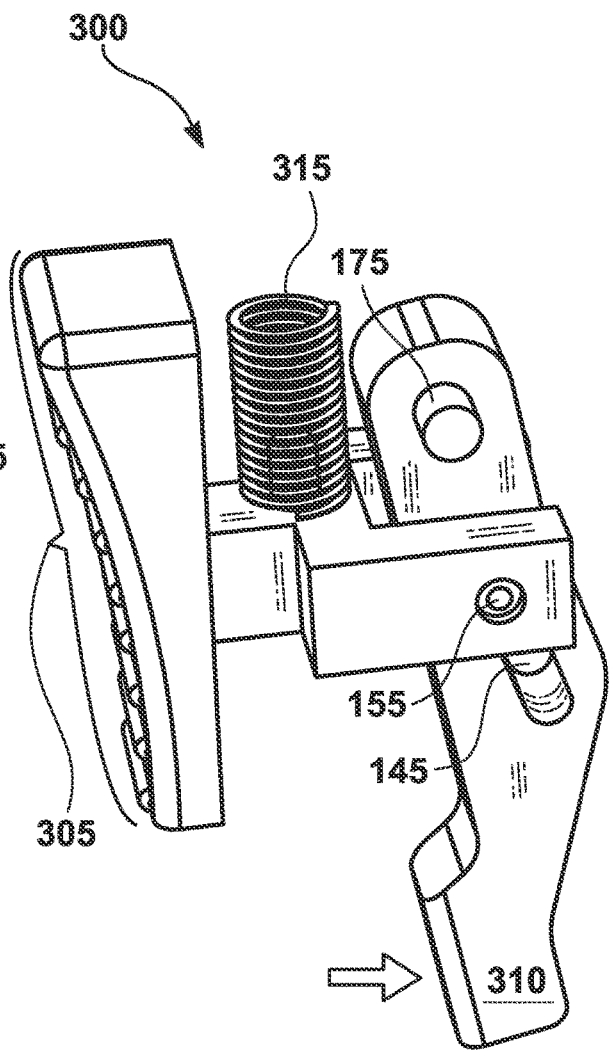
FIG. 4C is a side view of the automatically locking, releasable, sub-assembly in an unlocked configuration according to various embodiments of the present technology.
Figure 5A:
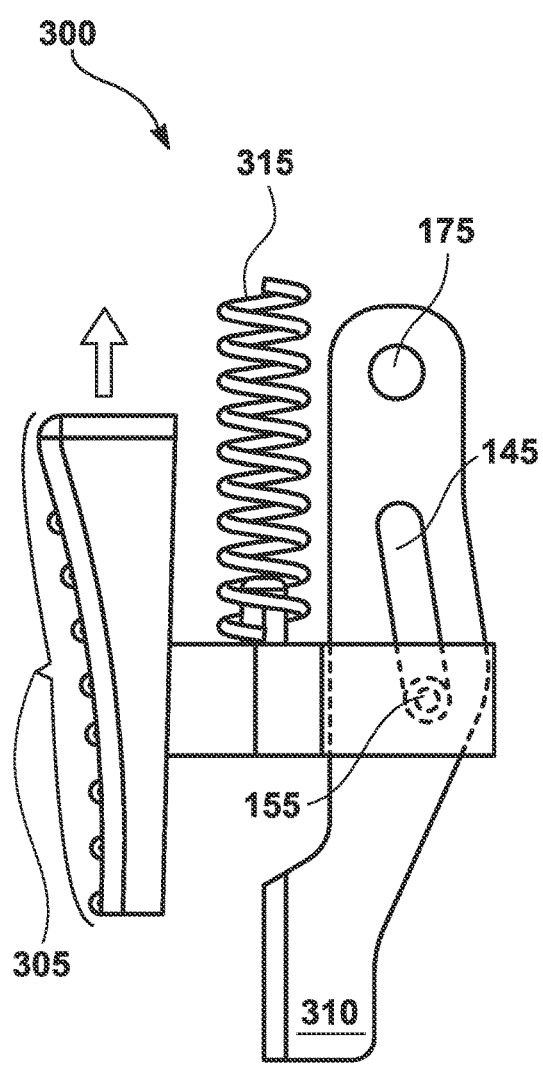
FIG. 5A is a side view of the automatically locking, releasable, sub-assembly in a locked configuration according to various embodiments of the present technology.
Figure 5B:
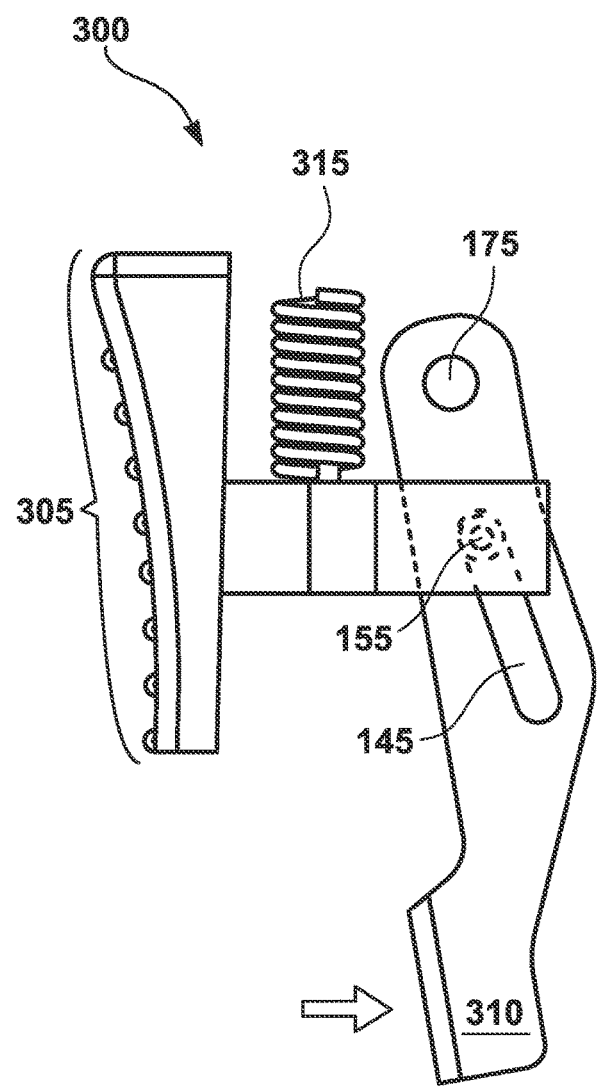
FIG. 5B is a side view of the automatically locking, releasable, sub-assembly in an unlocked configuration according to various embodiments of the present technology.

FIG. 4B, FIG. 4C, FIG. 5A, and FIG. 5B collectively show an automatically locking, releasable sub-assembly 300 according to various embodiments of the present technology. FIG. 4B is a side view of the automatically locking, releasable, sub-assembly 300 in a locked configuration according to various embodiments of the present technology. FIG. 4C is a side view of the automatically locking, releasable, sub-assembly 300 in an unlocked configuration according to various embodiments of the present technology. FIG. 5A is a side view of the automatically locking, releasable, sub-assembly 300 in a locked configuration according to various embodiments of the present technology. FIG. 5B is a side view of the automatically locking, releasable, sub-assembly 300 in an unlocked configuration according to various embodiments of the present technology.

In various embodiments the automatically locking, releasable, safety knob assembly, wherein the automatic locking arm 310 is resiliently biased with the slidable button 305 using a spring 315 as shown in FIG. 4B, FIG. 4C, FIG. 5A, and FIG. 5B.

Some embodiments include the automatically locking, releasable, safety knob assembly 100, wherein the automatically locking, releasable, sub-assembly 300, further comprises a spring positioning peg 320, the spring positioning peg 320 configured to position the spring 315 for the automatic locking arm 310 to be resiliently biased with the slidable button 305.

According to various embodiments FIG. 4B and FIG. 5A collectively include the automatically locking, releasable, safety knob assembly 100, wherein when the safety knob assembly 100 is in the locked configuration the knob 105 is in a locked position and the valve stem is in an off position preventing rotation of the valve stem and the spring 315 causes the automatic locking arm 310 to be resiliently biased with the slidable button 305 causing the automatic locking arm 310 to automatically remain engaged with the locking notch 225.

Some embodiments include the automatically locking, releasable, safety knob assembly 100, wherein when the safety knob assembly 100 is in the unlocked configuration the knob 105 is in an unlocked position and the valve stem is in an on position allowing rotation of the valve stem and the spring 315 causing the automatic locking arm 310 to be resiliently biased with the slidable button 305 causing the automatic locking arm 310 to automatically engage with the locking notch 225 when the automatic locking arm 310 is aligned with the locking notch 225.

According to various embodiments FIG. 4B, FIG. 4C, FIG. 5A, and FIG. 5B collectively include the automatically locking, releasable, safety knob assembly 100, wherein the automatic locking arm 310 further comprises a central arm movement aperture 145. Some embodiments include the automatically locking, releasable, safety knob assembly 100, wherein the central arm movement aperture 145 is angled in a direction opposite of the slidable button 305. Various embodiments include the automatically locking, releasable, safety knob assembly 100, wherein the automatically locking, releasable, sub-assembly 300, further comprises a sliding attachment dowel 155, the sliding attachment dowel 155 configured to mate with the central arm movement aperture. Some embodiments include the automatically locking, releasable, safety knob assembly 100, wherein when the safety knob assembly 100 is in the locked configuration the sliding attachment dowel 155 is in a lower portion of the central arm movement aperture 145 causing the automatic locking arm 310 to engage with the locking notch 225 and further causing the knob 105 to be in the locked configuration and the valve stem to be in an off position preventing rotation of the valve stem. Various embodiments include the automatically locking, releasable, safety knob assembly 100, wherein when the safety knob assembly is in the unlocked configuration the sliding attachment dowel 155 is in an upper portion of the central arm movement aperture 145 causing the automatic locking arm 310 to disengage with the locking notch 225 further causing the knob 105 to be in the unlocked configuration and the valve stem to be in an on position allowing rotation of the valve stem. Some embodiments include an upper attachment dowel 175.

Figure 6A:
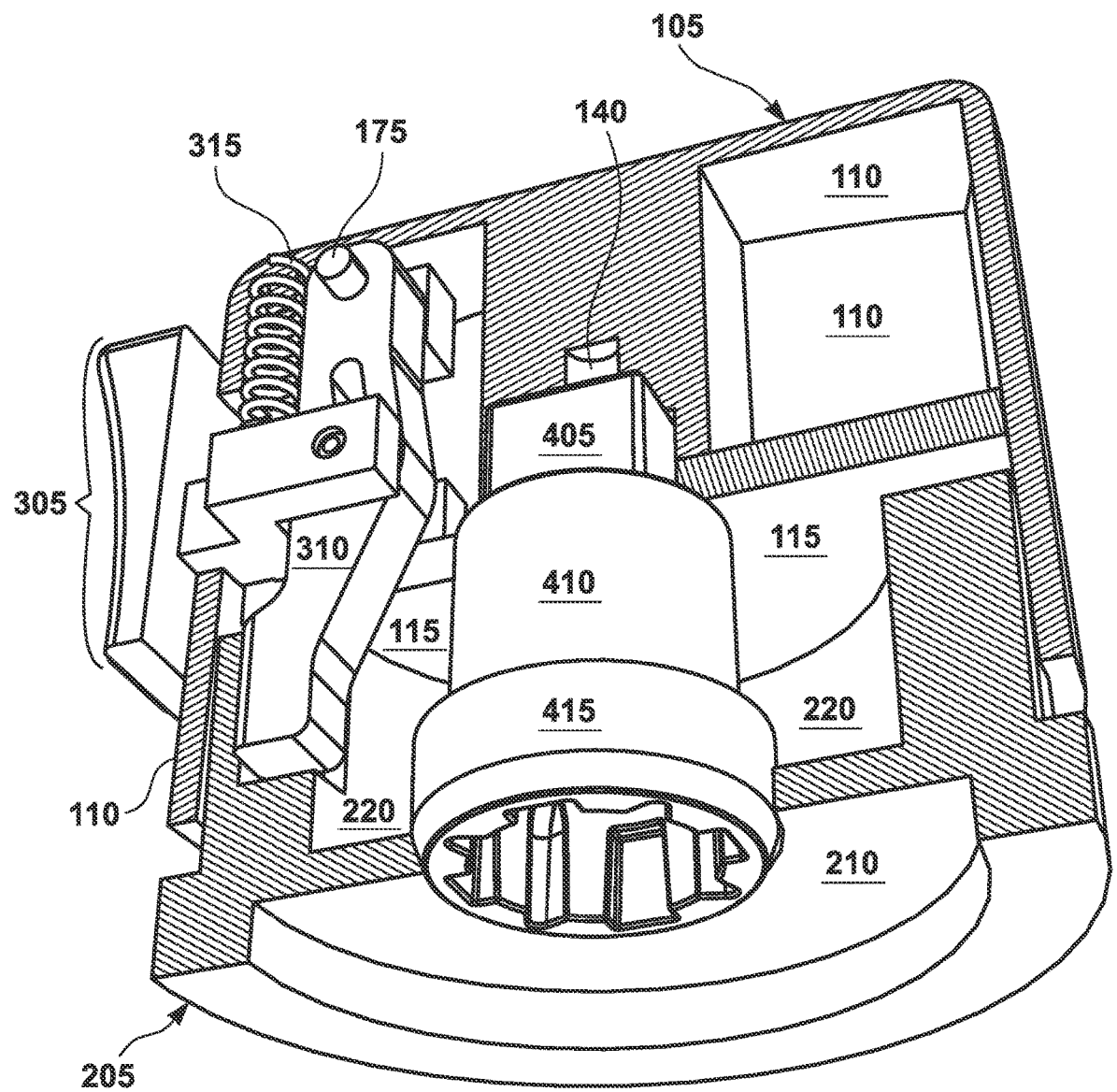
FIG. 6A is a side perspective cross sectional view of the automatically locking, releasable, safety knob assembly including the automatically locking, releasable, sub-assembly in a locked configuration according to various embodiments of the present technology.
Figure 6B:
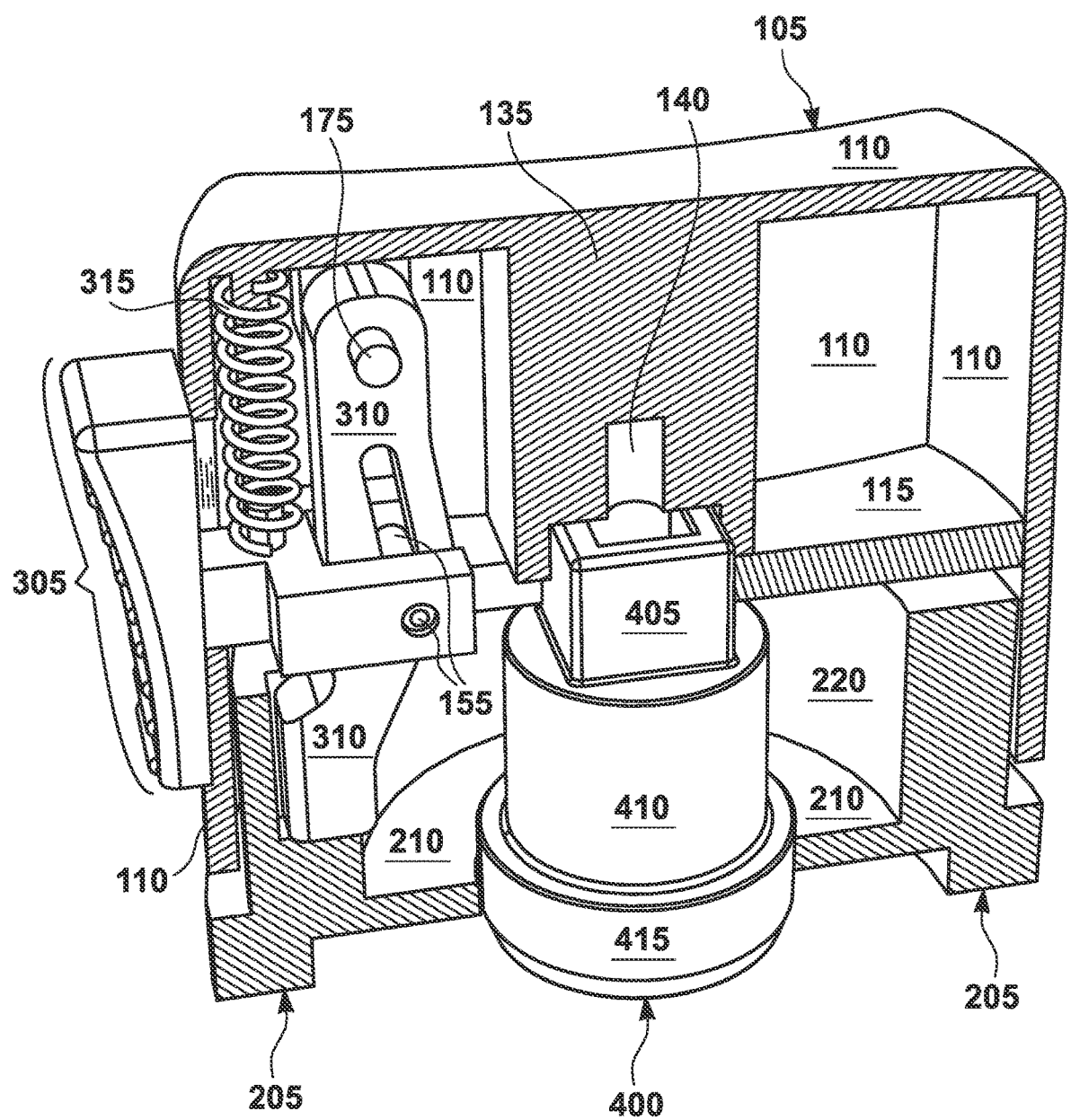
FIG. 6B is a side cross sectional view of the automatically locking, releasable, safety knob assembly including the automatically locking, releasable, sub-assembly in a locked configuration according to various embodiments of the present technology.
Figure 6C:
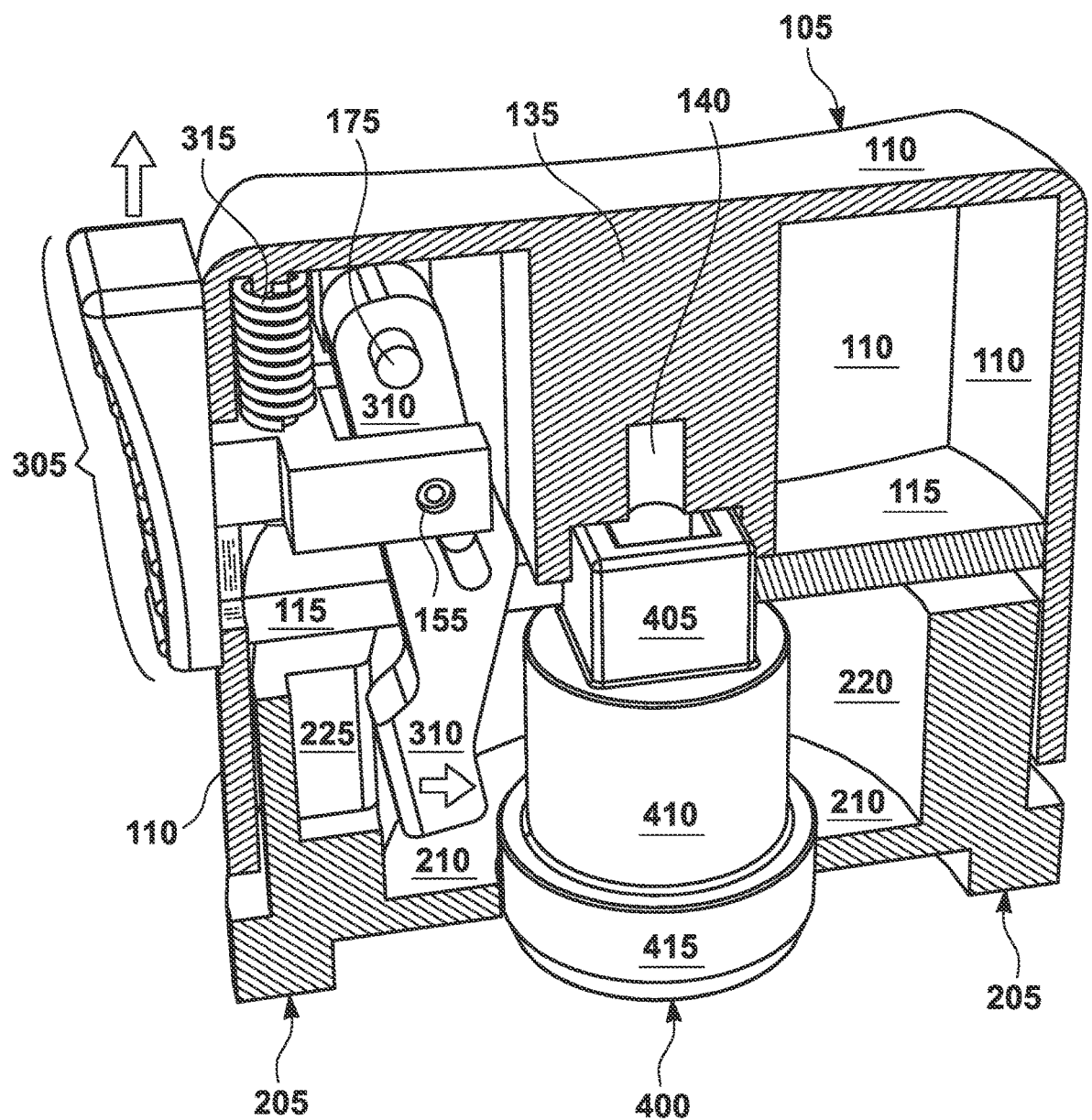
FIG. 6C is a side cross sectional view of the automatically locking, releasable, safety knob assembly including the automatically locking, releasable, sub-assembly in an unlocked configuration according to various embodiments of the present technology.
Figure 6D:
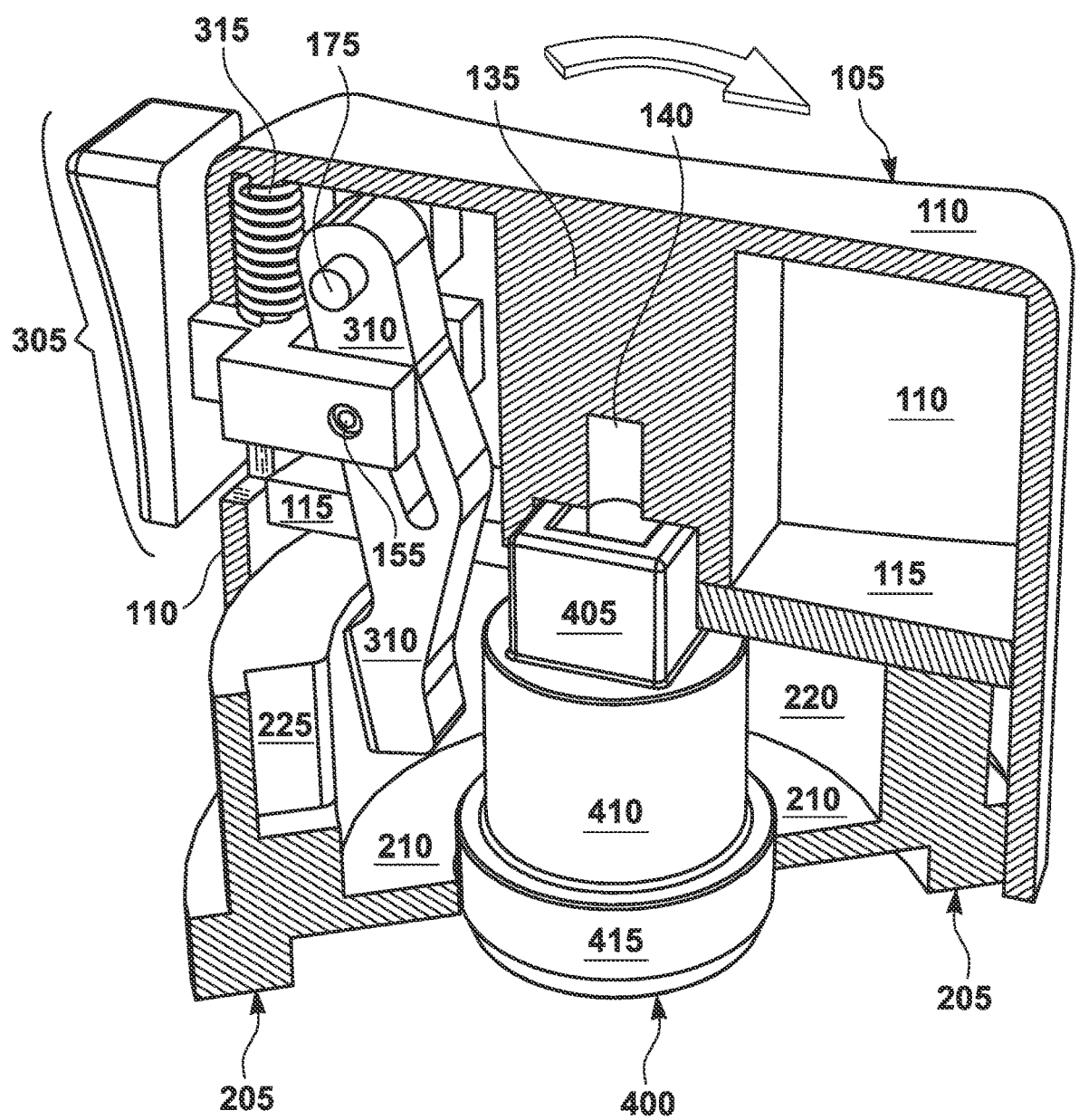
FIG. 6D is a side cross sectional view of the automatically locking, releasable, safety knob assembly including the automatically locking, releasable, sub-assembly in an unlocked configuration with the knob connected to the adapter freely rotating in a clockwise direction according to various embodiments of the present technology.

FIG. 6A, FIG. 6B, FIG. 6C, and FIG. 6D collectively show the automatically locking, releasable, safety knob assembly 100 including the automatically locking, releasable, sub-assembly 300 move from the locked configuration (FIG. 6A and FIG. 6B) to the unlocked configuration (FIG. 6C, and FIG. 6D) allowing the knob to freely rotating in a clockwise direction (as shown in FIG. 6D) resulting in rotating of the valve stem according to various embodiments of the present technology. FIG. 6A is a side perspective cross sectional view of the automatically locking, releasable, safety knob assembly 100 including the automatically locking, releasable, sub-assembly 300 in a locked configuration according to various embodiments of the present technology. FIG. 6B is a side cross sectional view of the automatically locking, releasable, safety knob assembly 100 including the automatically locking, releasable, sub-assembly 300 in a locked configuration according to various embodiments of the present technology. FIG. 6C is a side cross sectional view of the automatically locking, releasable, safety knob assembly 100 including the automatically locking, releasable, sub-assembly 300 in an unlocked configuration according to various embodiments of the present technology. FIG. 6D is a side cross sectional view of the automatically locking, releasable, safety knob assembly 100 including the automatically locking, releasable, sub-assembly 300 in an unlocked configuration with the knob connected to the adapter 400 freely rotating in a clockwise direction according to various embodiments of the present technology.

An automatically locking, releasable, safety knob assembly 100 (also referenced as "the safety knob assembly 100"), comprising: a base 205 configured to mount to a stove surface of a stove, the base 205 comprising: a disk portion 210; an outer peripheral sidewall 215; and an inner peripheral sidewall 220, the inner peripheral sidewall comprising a locking notch 225; an adapter 400 configured to mate with a valve stem of the stove extending through the base 205, the adapter 400 comprising: a head 405; a tubular middle section 410; an adapter base 415; and an adapter central aperture 420 extending through the adapter base 415, the tubular middle section 410, and the head 405, the adapter central aperture 420 configured to receive the valve stem of the stove; and a knob 105 comprising: a knob housing 110; and a housing disk 115 covering the base 205, the housing disk 115 comprising: an arm movement channel 120 aligned with the locking notch 225 when the safety knob assembly 100 in a locked configuration; and a housing disk central aperture, the housing disk central aperture 125 configured for receiving the head 405 of the adapter; and an automatically locking, releasable, sub-assembly 300, comprising: a slidable button 305 configured to allow free rotation of the knob 105 when the safety knob assembly 100 in an unlocked configuration; an automatic locking arm 310 resiliently biased with the slidable button 305; and wherein engagement of the slidable button 305 causes the automatic locking arm 310 to disengage from the locking notch 225 and further causes the automatic locking arm 310 to move in the arm movement channel 120 causing the safety knob assembly 100 to be in the unlocked and allowing the knob 105 to freely rotate resulting in rotating of the valve stem.

Some embodiments include the automatically locking, releasable, safety knob assembly 100, wherein when the safety knob assembly 100 is in the locked configuration the knob 105 is in a locked position and the valve stem is in an off position preventing rotation of the valve stem.

Some embodiments include the automatically locking, releasable, safety knob assembly 100, wherein when the safety knob assembly 100 is in the unlocked configuration the knob 105 is in an unlocked position and the valve stem is in an on position allowing rotation of the valve stem.

Various embodiments include the automatically locking, releasable, safety knob assembly 100, wherein the knob housing 110 further comprises: a contact portion 130 configured to allow contact from fingers of a user for rotating the knob 105 when the safety knob assembly 100 is in the unlocked configuration, the contact portion 130 comprising: a left side opposing contact portion 133; and a right side opposing contact portion 136, the right side opposing contact portion 136 being opposed to the left side opposing contact portion 133.

Various embodiments include the automatically locking, releasable, safety knob assembly, wherein the automatic locking arm 310 is resiliently biased with the slidable button 305 using a spring 315.

Some embodiments include the automatically locking, releasable, safety knob assembly 100, wherein the automatically locking, releasable, sub-assembly 300, further comprises a spring positioning peg 320, the spring positioning peg 320 configured to position the spring 315 for the automatic locking arm 310 to be resiliently biased with the slidable button 305.

Various embodiments include the automatically locking, releasable, safety knob assembly 100, wherein when the safety knob assembly 100 is in the locked configuration the knob 105 is in a locked position and the valve stem is in an off position preventing rotation of the valve stem and the spring 315 causes the automatic locking arm 310 to be resiliently biased with the slidable button 305 causing the automatic locking arm 310 to automatically remain engaged with the locking notch 225.

Some embodiments include the automatically locking, releasable, safety knob assembly 100, wherein when the safety knob assembly 100 is in the unlocked configuration the knob 105 is in an unlocked position and the valve stem is in an on position allowing rotation of the valve stem and the spring 315 causing the automatic locking arm 310 to be resiliently biased with the slidable button 305 causing the automatic locking arm 310 to automatically engage with the locking notch 225 when the automatic locking arm 310 is aligned with the locking notch 225.

Various embodiments include the automatically locking, releasable, safety knob assembly 100, wherein the automatic locking arm 310 further comprises a central arm movement aperture 145.

Some embodiments include the automatically locking, releasable, safety knob assembly 100, wherein the central arm movement aperture 145 is angled in a direction opposite of the slidable button 305.

Various embodiments include the automatically locking, releasable, safety knob assembly 100, wherein the automatically locking, releasable, sub-assembly 300, further comprises a sliding attachment dowel 155, the sliding attachment dowel 155 configured to mate with the central arm movement aperture. Some embodiments include an upper attachment dowel 175.

Some embodiments include the automatically locking, releasable, safety knob assembly 100, wherein when the safety knob assembly 100 is in the locked configuration the sliding attachment dowel 155 is in a lower portion of the central arm movement aperture 145 causing the automatic locking arm 310 to engage with the locking notch 225 and further causing the knob 105 to be in the locked configuration and the valve stem to be in an off position preventing rotation of the valve stem. Some embodiments include an upper attachment dowel 175.

Various embodiments include the automatically locking, releasable, safety knob assembly 100, wherein when the safety knob assembly 100 is in the unlocked configuration the sliding attachment dowel 155 is in an upper portion of the central arm movement aperture 145 causing the automatic locking arm 310 to disengage with the locking notch 225 further causing the knob 105 to be in the unlocked configuration and the valve stem to be in an on position allowing rotation of the valve stem.

Some embodiments include the automatically locking, releasable, safety knob assembly 100, wherein the housing disk covering the base 205 further comprises at least one positioning aperture 150, the at least one positioning aperture 150 used to attach the housing disk to the knob housing 110.

Various embodiments include the automatically locking, releasable, safety knob assembly 100, wherein the adapter base 415 further comprises: an adapter base outer peripheral sidewall 425; and an adapter base inner peripheral sidewall 430, the adapter base inner peripheral sidewall 430 comprising: valve stem compatibility notches 435, the valve stem compatibility notches 435 allowing the adapter base 415 to mate with the valve stem.

Some embodiments include the automatically locking, releasable, safety knob assembly 100, wherein the knob housing 110 further comprises: a central shaft portion 135, the central shaft portion 135 configured to mate with the head 405 of the adapter 400; and a central shaft aperture 140, the central shaft aperture 140 configured to receive the valve stem.

Various embodiments include the automatically locking, releasable, safety knob assembly 100, wherein when the safety knob assembly 100 is in the locked configuration the central shaft aperture 140 is receiving the valve stem and the valve stem is in an off position preventing rotation of the valve stem.

Some embodiments include the automatically locking, releasable, safety knob assembly 100, wherein when the safety knob assembly 100 is in the unlocked configuration the central shaft aperture 140 is receiving the valve stem and the valve stem is in an on position allowing rotation of the valve stem.

An automatically locking, releasable, safety knob assembly 100 (also referenced as "the safety knob assembly 100"), comprising: a base 205 configured to mount to a stove surface of a stove, the base 205 comprising: a disk portion 210; an outer peripheral sidewall 215; and an inner peripheral sidewall 220, the inner peripheral sidewall comprising a locking notch 225; an adapter 400 configured to mate with a valve stem of the stove extending through the base 205, the adapter 400 comprising: a head 405; a tubular middle section 410; an adapter base 415; and an adapter central aperture 420 extending through the adapter base 415, the tubular middle section 410, and the head 405, the adapter central aperture 420 configured to receive the valve stem of the stove; and a knob 105 comprising: a knob housing 110; and a housing disk 115 covering the base 205, the housing disk 115 comprising: an arm movement channel 120 aligned with the locking notch 225 when the safety knob assembly 100 in a locked configuration; and a housing disk central aperture 125, the housing disk central aperture 125 configured for receiving the head 405 of the adapter; and an automatically locking, releasable, sub-assembly 300, including: a slidable button 305 configured to allow free rotation of the knob 105 when the safety knob assembly 100 in an unlocked configuration; and an automatic locking arm 310 resiliently biased with the slidable button 305; wherein the slidable button 305 is not engaged and the automatic locking arm 310 is engaged with the locking notch 225 preventing the automatic locking arm 310 from moving in the arm movement channel 120 causing the safety knob assembly 100 to be in the locked configuration and preventing the knob 105 from freely rotating preventing rotating of the valve stem.

An automatically locking, releasable, safety knob assembly 100 (also referenced as "the safety knob assembly 100"), comprising: a base 205 configured to mount to a stove surface of a stove, the base 205 comprising: a disk portion 210; an outer peripheral sidewall 215; and an inner peripheral sidewall 220, the inner peripheral sidewall comprising a locking notch 225; an adapter 400 configured to mate with a valve stem of the stove extending through the base 205, the adapter 400 comprising: a head 405; a tubular middle section 410; an adapter base 415; and an adapter central aperture 420 extending through the adapter base 415, the tubular middle section 410, and the head 405, the adapter central aperture 420 configured to receive the valve stem of the stove; and a knob 105 comprising: a knob housing 110; and a housing disk 115 covering the base 205, the housing disk 115 comprising: an arm movement channel 120 aligned with the locking notch 225 when the safety knob assembly 100 in a locked configuration; a housing disk central aperture 125, the housing disk central aperture 125 configured for receiving the head 405 of the adapter; and a sliding attachment dowel 155, the sliding attachment dowel 155 configured to mate with a central arm movement aperture 145; and an automatically locking, releasable, sub-assembly 300, including: a slidable button 305 configured to allow free rotation of the knob 105 when the safety knob assembly 100 in an unlocked configuration; and an automatic locking arm 310 resiliently biased with the slidable button 305, the automatic locking arm 310 including the central arm movement aperture 145, the central arm movement aperture 145 being angled in a direction opposite of the slidable button 305; wherein the safety knob assembly 100 is in the locked configuration and the sliding attachment dowel 155 is in a lower portion of the central arm movement aperture 145 causing the automatic locking arm 310 to engage with the locking notch 225 and further causing the knob 105 to be in the locked configuration and the valve stem to be in an off position preventing rotation of the valve stem; wherein the slidable button 305 is not engaged and the automatic locking arm 310 is engaged with the locking notch 225 preventing the automatic locking arm 310 from moving in the arm movement channel 120 causing the safety knob assembly 100 to be in the locked configuration and preventing the knob 105 from freely rotating preventing rotating of the valve stem. Some embodiments include an upper attachment dowel 175.

Some embodiments include an automatically locking, releasable, safety knob assembly 100 (also referenced as "the safety knob assembly 100"), comprising: a base 205 configured to mount to a stove surface of a stove, the base 205 comprising: a disk portion 210; an outer peripheral sidewall 215; and an inner peripheral sidewall 220, the inner peripheral sidewall comprising a locking notch 225; an adapter 400 configured to mate with a valve stem of the stove extending through the base 205, the adapter 400 comprising: a head 405; a tubular middle section 410; an adapter base 415; and an adapter central aperture 420 extending through the adapter base 415, the tubular middle section 410, and the head 405, the adapter central aperture 420 configured to receive the valve stem of the stove; and a knob 105 comprising: a knob housing 110; and a housing disk 115 covering the base 205, the housing disk 115 comprising: an arm movement channel 120 aligned with the locking notch 225 when the safety knob assembly 100 in a locked configuration; and a housing disk central aperture 125, the housing disk central aperture 125 configured for receiving the head 405 of the adapter; and an automatically locking, releasable, sub-assembly 300, including: a slidable button 305 configured to allow free rotation of the knob 105 when the safety knob assembly 100 in an unlocked configuration; and an automatic locking arm 310 resiliently biased with the slidable button 305; wherein the slidable button 305 is not engaged and the automatic locking arm 310 is engaged with the locking notch 225 preventing the automatic locking arm 310 from moving in the arm movement channel 120 causing the safety knob assembly 100 to be in the locked configuration and preventing the knob 105 from freely rotating preventing rotating of the valve stem.

While this technology is susceptible of embodiments in many different forms, there is shown in the drawings and has been described in detail several specific embodiments with the understanding that the present disclosure is to be considered as an exemplification of the principles of the technology and is not intended to limit the technology to the embodiments illustrated.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. An automatically locking, releasable, safety knob assembly, comprising:
    a base configured to mount to a stove surface of a stove, the base comprising:
        a locking notch;
    an adapter configured to mate with a valve stem of the stove extending through the base; and
    a knob comprising:
        a knob housing; and
        an automatically locking, releasable, sub-assembly, comprising:
            a slidable button configured to allow free rotation of the knob when the safety knob assembly is in an unlocked configuration; and
            an automatic locking arm resiliently biased with the slidable button;
    wherein engagement of the slidable button causes the automatic locking arm to disengage from the locking notch and causes the safety knob assembly to be in the unlocked configuration and allowing the knob to freely rotate, resulting in rotation of the valve stem.

2. The automatically locking, releasable, safety knob assembly according to claim 1, wherein when the safety knob assembly is in a locked configuration, the knob is in a locked position and the valve stem is in an off position, preventing rotation of the valve stem.

3. The automatically locking, releasable, safety knob assembly according to claim 1, wherein when the safety knob assembly is in the unlocked configuration, the knob is in an unlocked position and the valve stem is in an on position, allowing rotation of the valve stem.

4. The automatically locking, releasable, safety knob assembly according to claim 1, wherein the knob housing further comprises:
    a contact portion configured to allow contact from fingers of a user for rotating the knob when the safety knob assembly is in the unlocked configuration, the contact portion comprising:
        a left side opposing contact portion; and
        a right side opposing contact portion, the right side opposing contact portion being opposed to the left side opposing contact portion.

5. The automatically locking, releasable, safety knob assembly according to claim 1, wherein the automatic locking arm is resiliently biased with the slidable button using a spring.

6. The automatically locking, releasable, safety knob assembly according to claim 5,
    wherein the automatically locking, releasable, sub-assembly, further comprises a spring positioning peg, the spring positioning peg configured to position the spring for the automatic locking arm to be resiliently biased with the slidable button.

7. The automatically locking, releasable, safety knob assembly according to claim 5, wherein when the safety knob assembly is in a locked configuration, the knob is in a locked position and the valve stem is in an off position preventing rotation of the valve stem, and the spring causes the automatic locking arm to be resiliently biased with the slidable button causing the automatic locking arm to automatically remain engaged with the locking notch.

8. The automatically locking, releasable, safety knob assembly according to claim 5, wherein when the safety knob assembly is in the unlocked configuration, the knob is in an unlocked position and the valve stem is in an on position allowing rotation of the valve stem, and the spring causing the automatic locking arm to be resiliently biased with the slidable button and causing the automatic locking arm to automatically engage with the locking notch when the automatic locking arm is aligned with the locking notch.

9. The automatically locking, releasable, safety knob assembly according to claim 5, wherein the automatic locking arm further comprises a central arm movement aperture.

10. The automatically locking, releasable, safety knob assembly according to claim 9, wherein the central arm movement aperture is angled in a direction opposite of the slidable button.

11. The automatically locking, releasable, safety knob assembly according to claim 9,
    wherein the automatically locking, releasable, sub-assembly, further comprises a sliding attachment dowel, the sliding attachment dowel configured to mate with the central arm movement aperture.

12. The automatically locking, releasable, safety knob assembly according to claim 11, wherein when the safety knob assembly is in a locked configuration, the sliding attachment dowel is in a lower portion of the central arm movement aperture causing the automatic locking arm to engage with the locking notch and further causing the knob to be in the locked configuration and the valve stem to be in an off position, preventing rotation of the valve stem.

13. The automatically locking, releasable, safety knob assembly according to claim 11, wherein when the safety knob assembly is in the unlocked configuration, the sliding attachment dowel is in an upper portion of the central arm movement aperture causing the automatic locking arm to disengage with the locking notch and further causing the knob to be in the unlocked configuration and the valve stem to be in an on position, allowing rotation of the valve stem.

14. The automatically locking, releasable, safety knob assembly according to claim 1,
wherein the knob further comprises:
a housing disk covering the base, the housing disk comprising:
an arm movement channel aligned with the locking notch when the safety knob assembly is in a locked configuration; and
a housing disk central aperture, the housing disk central aperture configured for receiving a head of the adapter;
wherein the housing disk covering the base further comprises at least one positioning aperture, the at least one positioning aperture used to attach the housing disk to the knob housing.

15. The automatically locking, releasable, safety knob assembly according to claim 1,
wherein the adapter comprises:
a head;
a tubular middle section;
an adapter base; and
an adapter central aperture extending through the adapter base, the tubular middle section, and the head, the adapter central aperture configured to receive the valve stem of the stove;
wherein the adapter base further comprises:
an adapter base outer peripheral sidewall; and
an adapter base inner peripheral sidewall, the adapter base inner peripheral sidewall comprising:
valve stem compatibility notches, the valve stem compatibility notches allowing the adapter base to mate with the valve stem.

16. The automatically locking, releasable, safety knob assembly according to claim 15, wherein the knob housing further comprises:
a central shaft portion, the central shaft portion configured to mate with the head of the adapter; and
a central shaft aperture, the central shaft aperture configured to receive the valve stem.

17. The automatically locking, releasable, safety knob assembly according to claim 16, wherein when the safety knob assembly is in a locked configuration, the central shaft aperture is receiving the valve stem and the valve stem is in an off position, preventing rotation of the valve stem.

18. The automatically locking, releasable, safety knob assembly according to claim 16, wherein when the safety knob assembly is in the unlocked configuration, the central shaft aperture is receiving the valve stem and the valve stem is in an on position, allowing rotation of the valve stem.

* * * * *